(12) United States Patent
Biscan et al.

(10) Patent No.: US 8,574,358 B2
(45) Date of Patent: Nov. 5, 2013

(54) GEOPOLYMERIC PARTICLES, FIBERS, SHAPED ARTICLES AND METHODS OF MANUFACTURE

(75) Inventors: Giang Biscan, Fontana, CA (US);
Hamid Hojaji, Claremont, CA (US);
David L. Melmeth, Fontana, CA (US);
Thinh Pham, Rancho Cucamonga, CA (US); Huagang Zhang, Yucaipa, CA (US)

(73) Assignee: James Hardie Technology Limited, Dublin (IE)

( * ) Notice: Subject to any disclaimer, the term of this patent is extended or adjusted under 35 U.S.C. 154(b) by 436 days.

(21) Appl. No.: 11/635,779

(22) Filed: Dec. 6, 2006

(65) Prior Publication Data
US 2007/0144407 A1 Jun. 28, 2007

Related U.S. Application Data

(60) Provisional application No. 60/748,037, filed on Dec. 6, 2005.

(51) Int. Cl.
| | |
|---|---|
| *C04B 14/04* | (2006.01) |
| *C04B 7/00* | (2006.01) |
| *C04B 7/34* | (2006.01) |
| *C04B 28/00* | (2006.01) |
| *C04B 32/00* | (2006.01) |
| *C04B 16/08* | (2006.01) |
| *C04B 20/00* | (2006.01) |
| *C04B 38/00* | (2006.01) |
| *C04B 14/00* | (2006.01) |
| *C04B 18/06* | (2006.01) |

(52) U.S. Cl.
USPC ........... 106/483; 106/484; 106/638; 106/672; 106/705; 106/816

(58) Field of Classification Search
USPC .................. 106/484, 483, 638, 672, 705, 816
See application file for complete search history.

(56) References Cited

U.S. PATENT DOCUMENTS

| | | | |
|---|---|---|---|
| 4,408,125 A | 10/1983 | Meuzelaar | 250/288 |
| 4,509,985 A | 4/1985 | Davidovits et al. | 106/84 |

(Continued)

FOREIGN PATENT DOCUMENTS

| | | | |
|---|---|---|---|
| DE | 4301749 A1 | * | 7/1994 |
| DE | 10220310 C1 | | 8/2003 |

(Continued)

OTHER PUBLICATIONS

Barbosa et al., "Thermal behaviour of inorganic geopolymers and composites derived from sodium polysialate," Materials Research Bulletin 38 (2003) 319-331.*

(Continued)

*Primary Examiner* — Eli Mekhlin
(74) *Attorney, Agent, or Firm* — Knobbe Martens Olson & Bear, LLP

(57) ABSTRACT

Shaped geopolymeric particles, fibers, and articles incorporating at least one geopolymer are provided; the geopolymeric particles, fibers, and articles having a structure that is solid, foamed, hollow or with one or more voids. Geopolymers are formed by alkali activation of an aluminosilicate and/or aluminophosphate material. The end-products are shaped as spheres, flakes, fibers, aggregates thereof or articles. Such products are formed at low temperatures; wherein forming includes processing using techniques such as spray drying, melt spinning, or blowing. The shaped geopolymeric particles and fibers have high chemical durability, high mechanical strength, application-targeted flowability and packing properties, and are specially suited for incorporating into composite materials, articles, and for use in cementitious, polymeric, paint, printing, adhesion and coating applications. Shaped geopolymeric particles, fibers and articles having voids, hollow or foam-like structures are formed by adding one or more blowing agents.

18 Claims, 6 Drawing Sheets

(56) References Cited

U.S. PATENT DOCUMENTS

| | | | |
|---|---|---|---|
| 4,532,260 A | 7/1985 | MacKeighen et al. | 521/84.1 |
| 4,600,728 A | 7/1986 | MacKeighen et al. | 521/84.1 |
| 4,640,715 A | 2/1987 | Heitzmann et al. | 106/85 |
| 4,642,137 A | 2/1987 | Heitzmann et al. | 106/85 |
| 4,859,367 A | 8/1989 | Davidovits | 252/628 |
| 4,888,311 A | 12/1989 | Davidovits et al. | 501/95 |
| 4,980,131 A | 12/1990 | Meuzelaar et al. | 422/78 |
| 4,987,175 A * | 1/1991 | Bunnell, Sr. | 524/449 |
| 5,194,091 A | 3/1993 | Laney | 106/611 |
| 5,228,913 A | 7/1993 | Hinterwaldner et al. | 106/603 |
| 5,236,526 A | 8/1993 | Perotto | 149/17 |
| 5,244,726 A | 9/1993 | Laney et al. | 428/312.6 |
| 5,245,120 A | 9/1993 | Srinivasachar et al. | 588/256 |
| 5,288,321 A | 2/1994 | Davidovits | 106/713 |
| 5,316,751 A | 5/1994 | Kingsley et al. | 423/571 |
| 5,330,651 A | 7/1994 | Robertson et al. | 210/617 |
| 5,342,595 A | 8/1994 | Davidovits et al. | 423/328.1 |
| 5,349,118 A | 9/1994 | Davidovits | |
| 5,352,427 A | 10/1994 | Davidovits et al. | 423/328.1 |
| 5,387,738 A | 2/1995 | Beckham et al. | 588/256 |
| 5,480,556 A | 1/1996 | Ulan | 210/681 |
| 5,492,562 A | 2/1996 | Pettinato | 106/284.03 |
| 5,539,140 A | 7/1996 | Davidovits | 588/3 |
| 5,556,447 A | 9/1996 | Srinivasachar et al. | 75/670 |
| 5,700,107 A | 12/1997 | Newton | 405/128 |
| 5,798,307 A | 8/1998 | Davidovits et al. | 501/95.2 |
| 5,820,668 A | 10/1998 | Comrie | 106/600 |
| 5,851,677 A | 12/1998 | Laurent et al. | 428/446 |
| 5,858,533 A | 1/1999 | Greuter et al. | 428/404 |
| 5,925,449 A * | 7/1999 | Davidovits | 428/297.4 |
| 6,015,346 A | 1/2000 | Toussaint et al. | 523/142 |
| 6,057,628 A | 5/2000 | Viljoen et al. | 310/311 |
| 6,066,189 A | 5/2000 | Meyer et al. | 51/298 |
| 6,221,148 B1 | 4/2001 | Mathur et al. | 106/484 |
| 6,264,740 B1 | 7/2001 | McNulty, Jr. | 106/817 |
| 6,645,637 B2 | 11/2003 | Kaltenborn et al. | 428/447 |
| 6,709,169 B2 | 3/2004 | Rossi | 385/92 |
| 6,831,118 B2 | 12/2004 | Münzenberger | 523/218 |
| 6,869,473 B2 | 3/2005 | Comrie | 106/697 |
| 2001/0013302 A1 | 8/2001 | Mathur et al. | |
| 2002/0004547 A1 | 1/2002 | Kaltenborn et al. | |
| 2002/0037142 A1 | 3/2002 | Rossi | |
| 2002/0068775 A1 | 6/2002 | Munzenberger | |
| 2003/0041785 A1 | 3/2003 | Harrison | |
| 2004/0025465 A1 | 2/2004 | Aldea et al. | |
| 2004/0050384 A1 | 3/2004 | Stein et al. | |
| 2004/0058027 A1 | 3/2004 | Guichard et al. | |
| 2004/0072487 A1 | 4/2004 | Neumann et al. | |
| 2004/0079260 A1 | 4/2004 | Datta et al. | |
| 2004/0080063 A1 | 4/2004 | Datta et al. | |
| 2004/0081827 A1* | 4/2004 | Datta et al. | 428/384 |
| 2004/0176004 A1 | 9/2004 | Fyfe | |
| 2004/0255823 A1 | 12/2004 | Comrie | |
| 2004/0262801 A1 | 12/2004 | Hojaji et al. | |
| 2005/0009428 A1 | 1/2005 | Porter et al. | |
| 2005/0066857 A1 | 3/2005 | Li et al. | |
| 2005/0096207 A1 | 5/2005 | Urbanek | |
| 2005/0103235 A1 | 5/2005 | Harrison | |
| 2005/0139308 A1 | 6/2005 | Aldea et al. | |

FOREIGN PATENT DOCUMENTS

| | | | |
|---|---|---|---|
| EP | 0338060 B1 | 6/1991 | |
| EP | 0288502 B1 | 7/1991 | |
| EP | 0455582 B1 | 11/1991 | |
| EP | 0467731 B1 | 1/1992 | |
| EP | 0479680 B1 | 4/1992 | |
| EP | 0485966 A2 | 5/1992 | |
| EP | 0500845 B1 | 9/1992 | |
| EP | 0513060 B1 | 11/1992 | |
| EP | 0518962 B1 | 12/1992 | |
| EP | 0518980 B1 | 12/1992 | |
| EP | 0550345 B1 | 7/1993 | |
| EP | 0614858 A1 | 9/1994 | |
| EP | 0617179 B1 | 9/1994 | |
| EP | 0628670 B1 | 12/1994 | |
| EP | 0642904 A1 | 3/1995 | |
| EP | 0649150 B1 | 4/1995 | |
| EP | 0722174 A2 | 7/1996 | |
| EP | 0756904 A2 | 2/1997 | |
| EP | 0762945 B1 | 3/1997 | |
| EP | 0807093 B1 | 11/1997 | |
| EP | 0815064 B1 | 1/1998 | |
| EP | 0846088 B1 | 6/1998 | |
| EP | 0895972 A1 | 2/1999 | |
| EP | 0976886 B1 | 2/2000 | |
| EP | 1019593 B1 | 7/2000 | |
| EP | 1019594 B1 | 7/2000 | |
| EP | 1076208 B1 | 2/2001 | |
| EP | 1144159 B1 | 10/2001 | |
| EP | 1162640 A1 | 12/2001 | |
| EP | 1184522 A2 | 3/2002 | |
| EP | 1236566 B1 | 9/2002 | |
| EP | 1278975 B1 | 1/2003 | |
| EP | 1337385 A1 | 8/2003 | |
| EP | 1431378 A1 | 6/2004 | |
| EP | 1507749 A1 * | 2/2005 | |
| FR | 2512808 A * | 3/1983 | |
| FR | 2659319 | 9/1991 | |
| JP | 1252563 A | 10/1989 | |
| JP | 7133147 A | 5/1995 | |
| JP | 8301638 A | 11/1996 | |
| JP | 8301639 A | 11/1996 | |
| WO | WO 83/03093 | 9/1983 | |
| WO | WO 85/03699 | 8/1985 | |
| WO | WO 88/02741 | 4/1988 | |
| WO | WO 89/02766 | 4/1989 | |
| WO | WO 91/11405 | 8/1991 | |
| WO | WO 91/13830 | 9/1991 | |
| WO | WO 91/13840 | 9/1991 | |
| WO | WO 91/14828 | 10/1991 | |
| WO | WO 92/04298 | 3/1992 | |
| WO | WO 92/10615 | 6/1992 | |
| WO | WO 93/12842 | 7/1993 | |
| WO | WO 93/16965 | 9/1993 | |
| WO | WO 93/21126 | 10/1993 | |
| WO | WO 95/13995 | 5/1994 | |
| WO | WO 94/26439 | 11/1994 | |
| WO | WO 96/23745 | 8/1996 | |
| WO | WO 96/24442 | 8/1996 | |
| WO | WO 96/28398 | 9/1996 | |
| WO | WO 97/07871 | 3/1997 | |
| WO | WO 97/23427 | 7/1997 | |
| WO | WO 98/31644 | 7/1998 | |
| WO | WO 99/07649 | 2/1999 | |
| WO | WO 99/18299 | 4/1999 | |
| WO | WO 99/18300 | 4/1999 | |
| WO | WO 00/34197 | 6/2000 | |
| WO | WO 00/35632 | 6/2000 | |
| WO | WO 00/77793 | 12/2000 | |
| WO | WO 01/40135 | 6/2001 | |
| WO | WO 01/55049 | 8/2001 | |
| WO | WO 01/81797 | 11/2001 | |
| WO | WO 02/26457 | 4/2002 | |
| WO | WO 02/27365 | 4/2002 | |
| WO | WO 02/38355 | 5/2002 | |
| WO | WO 02/38381 | 5/2002 | |
| WO | WO 02/068184 | 9/2002 | |
| WO | WO 02/080191 | 10/2002 | |
| WO | WO 02/080192 | 10/2002 | |
| WO | WO 03/004899 | 1/2003 | |
| WO | WO 03/040054 | 5/2003 | |
| WO | WO 03/078349 | 9/2003 | |
| WO | WO 03/087008 | 10/2003 | |
| WO | WO 03/099738 | 12/2003 | |
| WO | WO 2004/011736 | 2/2004 | |
| WO | WO 2004/016680 | 2/2004 | |
| WO | WO 2004/018090 | 3/2004 | |
| WO | WO 2004/026698 | 4/2004 | |
| WO | WO 2004/076378 | 9/2004 | |
| WO | WO 2004/088676 | 10/2004 | |
| WO | WO 2004/101137 | 11/2004 | |
| WO | WO 2004/106705 | 12/2004 | |

(56) References Cited

FOREIGN PATENT DOCUMENTS

| WO | WO 2005/007988 | 1/2005 |
|---|---|---|
| WO | WO 2005/019130 | 3/2005 |
| WO | WO 2005/033038 | 4/2005 |
| WO | WO 2005/049522 | 6/2005 |
| WO | WO 2005/054340 | 6/2005 |

OTHER PUBLICATIONS

International Search Report for PCT/US2006/046721 mailed by the PCT Office of the USPTO on Sep. 27, 2007, 2 pp.
Written Opinion of the International Searching Authority for PCT/US2006/046721 mailed by the PCT Office of the USPTO on Sep. 27, 2007, 9 pp.
Almendros et al "Pyrolysis of carbohydrate-derived macromolecules: its potential in monitoring the carbohydrate signature of geopolymers," Journal of Analytical and Applied Pyrolysis vols. 40-41 (May 1997) pp. 599-610.
Bakharev, "Geopolymeric materials prepared using Class F fly ash and elevated temperature curing, Cement and Concrete Research" vol. 35 Issue 6 (Jun. 2005) pp. 1224-1232.
Bakharev, "Durability of geopolymer materials in sodium and magnesium sulfate solutions," Cement and Concrete Research, vol. 35 Issue 6, (Jun. 2005) pp. 1233-1246.
Bakharev, "Resistance of Geopolymer Materials to Acid Attack," Cement and Concrete Research, vol. 35, Issue 4, Apr. 2005, pp. 658-670.
Bankowski et al., "Reduction of Metal Leaching in Brown Coal Fly Ash Using Geopolymers," Journal of Hazardous Materials, vol. 114, Issues 1-3, Oct. 18, 2004, pp. 59-67.
Bankowski et al., "Using Inorganic Polymer to Reduce Leach Rates of Metals from Brown Coal Fly Ash," Minerals Engineering, vol. 17.
Bar et al., "Phenol-Formaldehyde Resins as a Link to the Understanding of the Isothermal Kinetic Behavior of Geopolymers (kerogens and coals)," Journal of Analytical and Applied Pyrolysis, vol. 19, Jul. 1991, pp. 265-277.
Bar et al., "Geopolymers and Synthetic Polymers: A Comparative Study of the Isothermal Pyrolysis Kinetic Behavior," Thermochimica Acta, vol. 148, Aug. 4, 1989, pp. 405-411.
Bar et al., "Fossil Fuels and Synthetic Polymers: Isothermal Pyrolysis Kinetics as Indication of Structural Resemblance," Journal of Analytical and Applied Pyrolysis, vol. 14, Issue 1, Sep. 1988, pp. 73-79.
Barbosa et al., "Synthesis and Thermal Behaviour of Potassium Sialate Geopolymers," Materials Letters, vol. 57, Issues 9-10, Feb. 2003, pp. 1477-1482.
Barbosa et al., "Thermal Behaviour of Inorganic Geopolymers and Composites Derived from Sodium Polysialate," Materials Research Bulletin, vol. 38, Issue 2, Jan. 25, 2003, pp. 319-331.
Benamou, et al., "Relative Importance of bio- and Geopolymers in Interstitial Waters: Spectrofluorometry and Bioassay Studies," Water Research, vol. 23, Issue 9, Sep. 1989, pp. 1127-1136.
Britt et al., "Effect of Cross-Linking on the Pyrolysis of Diphenylalkanes," Journal of Analytical and Applied Pyrolysis, vol. 25, Jun. 1993, pp. 407-418.
Buscail et al., "Biogeochemical Processes of Incorporation and Transformation of 14C Labelled Fulyic Acid, Humic Acid and Simple Organic Molecules at the Sediment-Water Interface (Submarine Canyon of the NW Mediterranean)," The Science of The Total Environment, vol. 62, 1987, pp. 409-412.
Buscail, "Biogeochemical Processes of Incorporation, Transformation and Migration of Organic Matter at the Marine Water-Sediment Interface: Simulation by 14C Labelled Compounds," Advances in Organic Geochemistry, vol. 10, Issue 4, pp. 1091-1097.
Cheng et al., "Fire-Resistant Geopolymer Produced by Granulated Blast Furnace Slag," Minerals Engineering, vol. 16, Issue 3, Mar. 2003, pp. 205-210.
Cioffi et al., "Optimization of Geopolymer Synthesis by Calcination and Polycondensation of a Kaolinitic Residue," Resources, Conservation and Recycling, vol. 40, Issue 1, Dec. 2003, pp. 27-38.

Cody et al., "Calculation of the 13C NMR Chemical Shift of Ether Linkages in Lignin Derived Geopolymers: Constraints on the Preservation of Lignin Primary Structure with Diagenesis," Geochimica et Cosmochimca Acta, vol. 63, Issue 2, Jan. 1999, pp. 193-205.
Cody et al., "The Application of Soft X-ray Microscopy to the In-situ Analysis of Sporinite in Coal," International Journal of Coal Geology, vol. 32, Issues 1-4, Dec. 1996, pp. 69-86.
Collazo-Lopez et al., "Applications of Inverse Chromatography in Organic Geochemistry—II. Measurement of Solute Activity Coefficients in Organic Geopolymers by Gas Chromatography," Organic Geochemistry, vol. 14, Issue 2, 1989, pp. 165-170.
Deep Sea Research Part B Oceanographic Literature Review, vol. 32, Issue 12, 1985, pp. 1012-1013.
Derenne, et al., "Occurrence of Non-Hydrolysable Amides in the Macromolecular Constituent of Scenedesmus Quadricauda Cell Wall as Revealed by 15N NMR: Origin of n-alkylnitriles in Pyrolysates of Ultralaminae-Containing Kerogens," Geochimica et Cosmochimica Acta, vol. 57, Issue 4, Feb. 1993, pp. 851-857.
Derenne, et al., "Formation of Ultralaminae in Marine Kerogens Via Selective Preservation of Thin Resistant Outer Walls of Microalgae," Organic Geochemistry, vol. 19, Issues 4-6, Dec. 1992, pp. 345-350.
Engel, et al., "Simulated Diagenesis and Catagenesis of Marine Kerogen Precursors: Melanoidins as Model Systems for Light Hydrocarbon Generation," Organic Geochemistry, vol. 10, Issue 4, 1986, pp. 1073-1079.
Fernandez-Jimenez et al. "Microstructure Development of Alkali-Activated Fly Ash Cement: A Descriptive Model" Cement and Concrete Research, vol. 35, Issue 6, Jun. 2005, pp. 1204-1209.
Fink, et al., "Plastics Recycling Coupled with Enhanced Oil Recovery. A. Critical Survey of the Concept," Journal of Analytical and Applied Pyrolysis, vols. 40-41, May 1997, pp. 187-200.
Fletcher et al. "The Composition Range of Aluminosilicate Geopolymers," Journal of the European Ceramic Society, vol. 25, Issue 9, Jun. 2005, pp. 1471-1477.
Gonzalez-Villa, et al., "Pyrolytic Alkylation-Gas Chromatography-Mass Spectrometry of Model Polymers Further Insights into the Mechanism and Scope of the Technique," Journal of chromatography A, vol. 750, Issues 1-2, Oct. 25, 1996, pp. 155-160.
Goretta, et al., "Solid-Particle Erosion of a Geopolymer Containing Fly Ash and Blast-Furnace Slag," Wear, vol. 256, Issues 7-8, Apr. 2004, pp. 714-719.
Ishiwatari, et al., "Possible Interactions of Insoluble Organic Geopolymers (kerogen) with Organic Compounds in the Aquatic Environment—I. Interaction with Fatty Acid Methyl Esters," Physics and Chemistry of the Earth, vol. 12, 1980, pp. 495-503.
Iwahiro, et al., "Crystallization Behavior and Characteristics of Mullites Formed From Alumina-Silica Gels Prepared by the Geopolymer Technique in Acidic Conditions," Journal of the European Ceramic Society, vol. 21, Issue 14, 2001, pp. 2515-2519.
Jaarsveld, et al., "The Characterization of Source Materials in Fly Ash-Based Geopolymers" Materials Letters, vol. 57, Issue 7, Jan. 2003, pp. 1272-1280.
Jaarsveld, et al., "The Effect of Composition and Temperature on the Properties of Fly Ash-and Kaolinite-based Geopolymers," Chemical Engineering Journal, vol. 89, Issues 1-3, Oct. 28, 2002, pp. 63-73.
Jaarsveld, et al., "The effect of Metal Contaminants on the Formation and Properties of Waste-Based Geopolymers," Cement and Concrete Research, vol. 29, Issue 8, Aug. 1999, pp. 1189-1200.
Jaarsveld, et al., "The Potential Use of Geopolymeric Materials to Immobilise Toxic Metals: Part I. Theory and Applications," Minerals Engineering, vol. 10, Issue 7, Jul. 1997, pp. 659-669.
Jaarsveld, et al., "The Potential Use of Geopolymeric Materials to Immobilise Toxic Metals: Part II. Material and Leaching Characteristics," Minerals Engineering, vol. 12, Issue 1, Jan. 1999, pp. 75-91.
Jaffe et al., "Generation and Maturation of Carboxylic Acids in Ancient Sediments from the Maracaibo Basin, Venezuela," Organic Geochemistry, vol. 16, Issues 1-3, 1990, pp. 211-218.
Jiminez et al, "Microstructural Characterisation of Alkali-Activated PFA Matrices for Waste Immobilisation," Cement and Concrete Composites, vol. 26, Issue 8, Nov. 2004, pp. 1001-1006.
Kawamura, et al., "Dicarboxylic Acids Generated by Thermal Alteration of Kerogen and Humic Acids," Geochimica et Cosmochimica Acta, vol. 51, Issue 12, Dec. 1987, pp. 3201-3207.

(56) References Cited

OTHER PUBLICATIONS

Khalil, et al., "Immobilization of Intermediate-Level Wastes in Geopolymers," Journal of Nuclear Materials, vol. 211, Issue 2, Aug. 1, 1994, pp. 141-148.

Kim, et al., "Geopolymerization of Biopolymers: a Preliminary Inquire," Carbohydrate Polymers, vol. 56, Issue 2, Jun. 4, 2004, pp. 213-217.

Knicker, et al., Identification of Protein Remnants in Insoluble Geopolymers Using TMAH Thermochemolysis/GC-MS, Organic Geochemistry, vol. 32, Issue 3, Mar. 2001, pp. 397-409.

Largeau, et al., "Pyrolysis of Immature Torbanite and of the Resistant Biopolymer (PRB A) isolated from Extant Alga *Botryococcus braunii*, Mechanism of Formation and Structure of Torbanite," Organic Geochemistry, vol. 10, Issue 4, 1986, pp. 1023-1032.

Lee, et al., "The Interface Between Natural Siliceous Aggregates and Geopolymers," Cement and Concrete Research, vol. 34, Issue 2, Feb. 2004, pp. 195-206.

Lee, et al, "The effects of Inorganic Salt Contamination on the Strength and Durability of Geopolymers," Colloids and Surfaces A: Physicochemical and Engineering Aspects, vol. 211, Issues 2-3, Dec. 3, 2002, pp. 115-126.

Lee, et al., "Structural Reorganisation of Class F Fly Ash in Alkaline Silicate Solutions," Colloids and Surfaces A: Physicochemical and Engineering Aspects, vol. 211, Issue 1, Nov. 20, 2002, pp. 49-66.

Mounier, et al., Fluorescence 3D de la matiere organique dissoute du fleuve amazone: (Three-Dimensional Fluorescence of the Dissolved Organic Carbon in the Amazon River), Water Research, vol. 33, Issue 6, Apr. 1999, pp. 1523-1533.

Neuweiler et al., "The Modem Calcifying Sponge Spheciospongia Vesparium (Lamarck, 1815), Great Bahama Bank: Implications for Ancient Sponge Mud-Mounds," Sedimentary Geology, vol. 175, Issues 1-4, Apr. 15, 2005, pp. 89-98.

Phair, et al., "Effect of Al Source and Alkali Activation on Pb and Cu Immobilisation in Fly-Ash Based 'Geopolymers'," Applied Geochemistry, vol. 19, Issue 3, Mar. 2004, pp. 423-434.

Phair, et al., "Characteristics of aluminosilicate Hydrogels Related to Commerical 'Geopolymers,'" Materials Letters, vol. 57, Issue 28, Oct. 2003, pp. 4356-4367.

Phair, et al., "Effect of the Silicate Activator pH on the Microstructral Characteristics of Waste-Based Geopolymers," International Journal of Mineral Processing, vol. 66, Issues 1-4, Sep. 2002, pp. 121-143.

Phair, et al., "Effect of Silicate Activator pH on the Leaching and Material Characteristics of Waste-Based Inorganic Polymers," Minerals Engineering, vol. 14, Issue 3, Mar. 2001, pp. 289-304.

Ruble, et al., "Uinta Basin Wurtzilite: A Product of Natural Vulcanization?": Organic Geochemistry, vol. 22, Issue 1, Jan. 1995, pp. 127-136.

Schmucker et al., "Microstructure of Sodium Polysialate Siloxo Geopolymer," Ceramics International, vol. 31, Issue 3, 2005, pp. 433-437.

Singh et al. Geopolymer formation Processes at Room Temperature Studied by 29Si and 27Al MAS-NMR, Materials Science and Engineering A, vol. 396, Issues 1-2, Apr. 15, 2005, pp. 392-402.

Singh et al., "Outstanding Problems Posed by Nonpolymeric Particulates in the Synthesis of a Well-Structured Geopolymeric material," Cement and Concrete Research, vol. 34, Issue 10, Oct. 2004, p. 1943-1947.

Stankiewicz, et al., "Comparison of the Analytical Performance of Filament and Curie-Point Pyrolysis Devices," Journal of Analytical and Applied Pyrolysis, vol. 45, Issue 2, May 1998, pp. 133-151.

Sun, et al., "In Situ Monitoring of the Hydration Process of K-PS Geopolymer Cement with ESEM," Cement and Concrete Research, vol. 34, Issue 6, Jun. 2004, pp. 935-940.

Suzuki et al., "Formation of Malanoidins in the Presence of H2S," Organic Geochemistry, vol. 15, Issue 4, 1990, pp. 361-366.

Suzuki, "Characteristics of Amorphous Kerogens Fractionated from Terrigenous Sedimentary Rocks," Geochimca et Cosmochimica Acta, vol. 48, Issue 2, Feb. 1984, pp. 243-249.

Swanepoel et al., "Utilisation of Fly Ash in a Geopolymeric Material," Applied Geochemistry, vol. 17, Issue 8, Aug. 2002, pp. 1143-1148.

Taylor et al., Structural Relationships in Protokerogens and Other Geopolymers from Oxic and Anoxic Sediments [Cat Firth, Scotland] 1984. Org. Geochem., vol. 6, pp. 279-286.

Wang et al. "Reduction in Wear of Metakaolinite-Based Geopolymer Composite Through Filling of PTFE," Wear, vol. 258, Issue 10, May 2005, pp. 1562-1566.

Weng et al., "Effects of Aluminates on the Formation of Geopolymers," Materials Science and Engineering B, vol. 117, Issue 2, Mar. 15, 2005, pp. 163-168.

Xu, et al., "The Effect of Alkali Metals on the Formation of Geopolymeric Gels from Alkali-Feldspars," Colloids and Surfaces A: Physicochemical and Engineering Aspects, vol. 216, Issues 1-3, Apr. 15, 2003, pp. 27-44.

Xu, et al., "Geopolymerisation of Multiple Minerals," Minerals Engineering, vol. 15, Issue 12, Dec. 2002, pp. 1131-1139.

Xu, et al., "Microstructural Characterisation of Geopolymers Synthesised from Kaolinite/Stilbite Mixtures Using XRD, MAS-NMR, SEM/EDX, TEM/EDX, and HREM," Cement and Concrete Research, vol. 32, Issue 11, Nov. 2002, pp. 1705-1716.

Xu, et al., "The Geopolymerisation of Alumino-Silicate Minerals," International Journal of Mineral Processing, vol. 59, Issue 3, Jun. 2000, pp. 247-266.

Yip et al. "The Coexistence of Geopolymeric Gel and Calcium Silicate Hydrate at the Early Stage of Akaline Activation, Cement and Concrete Research," In Press, Corrected Proof, Available online May 4, 2005, pp. 1688-1697.

Zhang, et al., "Novel Modification Method for Inorganic Geopolymer by Using Water Soluble Organic Polymers," Materials, Letters, vol. 58, Issues 7-8, Mar. 2004, pp. 1292-1296.

\* cited by examiner

GEOPOLYMERIC PARTICLES, FIBERS, SHAPED ARTICLES AND METHODS OF MANUFACTURE

CROSS-REFERENCES TO RELATED APPLICATIONS

This application claims the benefit of U.S. Provisional Application No. 60/748,037 filed Dec. 6, 2005.

STATEMENT REGARDING FEDERALLY SPONSORED RESEARCH OR DEVELOPMENT

Not applicable.

BACKGROUND OF THE INVENTION

This invention relates generally to geopolymeric particles and fibers, methods of making and uses, such particles and fibers for general use and for incorporation into composite materials, and in particular, to a chemically durable and stable geopolymeric particles and fibers that may be made in various configurations, including spheres, fibers and flakes and aggregates thereof.

Composite materials such as fiber cement typically incorporate many components and additives to enhance and/or modify the properties or the manufacturing process of the material. For example, hollow microspheres may be used as density modifiers and processing aids for many composites, including fiber cement boards and light weight cement slurry. Solid microspheres are also used in many applications such as fillers and rheology modifiers. Additionally, fibers (e.g., cellulose fibers and glass fibers) are used in many composites as reinforcement.

Conventional microspheres and reinforcement fibers are typically made from glass, polymers, metals, and/or graphite. Unfortunately, there are several drawbacks associated with the making of microspheres and fibers out of these materials. For example, the formation of glass microspheres typically involve the use of high temperature conditions, which increases cost and is highly inefficient. In addition, many materials used to make conventional fibers and microspheres cannot typically withstand high service temperatures without significant degradation.

In light of such obstacles, there remains a need for improved microspheres and the like and methods of making them. It is, therefore, an object of the present invention to overcome or ameliorate one or more of the disadvantages of the prior art, as well as to provide one or more useful alternatives.

SUMMARY OF THE INVENTION

With the invention described herein, one or more disadvantages associated with microspheres and the like and methods of making are overcome. In addition, useful alternatives for such conventional microspheres and methods of making are provided.

Generally and in one form, provided herein include shaped particles, fibers, and articles processed from a precursor formulation comprising rapid setting and hardening inorganic materials (e.g., alkali-activated silicates), rapid setting cements (e.g., alkaline earth phosphates), and hydraulic pastes (e.g., calcium containing cements). A common attribute of the shaped particles, fibers and articles is in the method of making them, in which they are processed at a low temperature (e.g., below the melting temperature of the resultant composition), herein referred to as cold processing. Precursors may be configured in any number of end-product forms, including spheres, particles, fibers and flakes and aggregates thereof, as well as molded shapes. The formed shapes preferably incorporate a geopolymer as its functional building block. In several embodiments, formed shaped particles, fibers or articles include at least one void or pore space therein. The geopolymeric particle is typically made by polymerization of a precursor formulation that has materials capable of forming a geopolymer; the precursor formulation comprising at least one alkali-activated silicate such as alumina silicate. Particles and articles have shapes that include substantially round, donut-shaped, oval, elongated, tubular, square, polygonal, substantially flat and varying combinations thereof. Fibers have cross-sectional shapes that include substantially round, donut-shaped, oval, elongated, tubular, square, polygonal, substantially flat and varying combinations thereof In another form, geopolymeric particles and/or fibers are incorporated into one or more composite materials or articles; the geopolymeric particles or fibers include at least one geopolymer. In one or more embodiments, the composite article is a fiber-reinforced cement composite. A composite article may be in the form of a panel, board, post, siding, plank, post, container or other shaped article such as for buildings. For light-weight shaped articles comprising geopolymeric particles or fibers, the particle typically comprises at least one void therein. A shaped article may be defined by a mold and may include a foam-like structure.

In still another form, formed geopolymeric particles or fibers are used with abrasives, paints, chemical and hydraulic fracturing applications, wherein geopolymeric particles and/or fibers are formed by incorporating at least one geopolymer therein. When such compositions are in the form of a fiber, they may be used to form a cloth, fabric, sponge or carpet, as examples.

In yet another form, a precursor formulation having at least one geopolymer is manufactured into one or more shapes, including particles or fibers. A method for forming such shapes typically comprises providing a precursor formulation and shaping the precursor to form a geopolymeric particle or fiber or article. The precursor formulation typically comprises at least one silicate source (e.g., aluminosilicate) and an alkali source (typically as an hydroxide, silicate or combinations thereof). The precursor formulation may also include a rheology modifier. In addition or optionally, the precursor formulation may include one or more suitable blowing agents, one or more calcium-containing compounds (e.g., cementitious compound, calcium carbonate, lime stone), one or more filler materials (e.g., polymer, cellulose, carbon-based compound, glass, ceramic fibers, phosphate clay), a colorant, one or more surface activation agents and combinations thereof. Filler materials, colorants, and/or surface activation agents may also be incorporated after formation of the composition. Suitable processes for shaping include thermal spray drying, spray drying, melt spinning or blowing. The precursor formulation and process parameters may be predetermined to control material viscosity of the formulation and, thereby, control the shape of the resultant geopolymeric particle, fiber or article.

Those skilled in the art will further appreciate the above-noted features and advantages of the invention together with other important aspects thereof upon reading the detailed description that follows in conjunction with the drawings.

BRIEF DESCRIPTION OF THE DRAWINGS

For more complete understanding of the features and advantages of the present invention, reference is now made to a description of the invention along with accompanying figures, wherein.

DETAILED DESCRIPTION OF PREFERRED EMBODIMENTS

Figure 1:
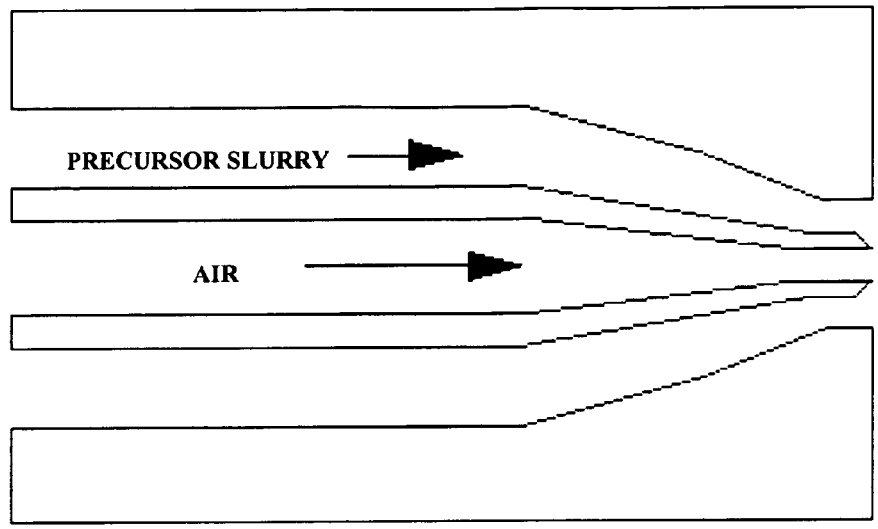
FIG. 1 depicts a representative nozzle design used for forming a geopolymeric fiber.

Although making and using various embodiments are discussed in detail below, it should be appreciated that the present invention provides many inventive concepts that may be embodied in a wide variety of contexts. The specific aspects and embodiments discussed herein are merely illustrative of ways to make and use the invention, and do not limit the scope of the invention.

In the description which follows like parts may be marked throughout the specification and drawing with the same reference numerals, respectively. The drawing figures are not necessarily to scale and certain features may be shown exaggerated in scale or in somewhat generalized or schematic form in the interest of clarity and conciseness.

As used herein, the term "geopolymer" is a broad term and shall have its ordinary meaning and shall include, without limitation, a synthetic and substantially amorphous polymer with a silicoaluminate framework.

The term "geopolymeric" is a broad term and will have its ordinary meanings, and shall include, but is not limited to, a material incorporating at least one geopolymer.

The term "alkali activation" is a broad term and will be given its ordinary meaning, and shall include, but is not limited to, a chemical reaction or group of chemical reactions that form one or more cross-linking silicoaluminates in the presence of at least one alkali compound.

The term "precursor" (also referred to as geopolymeric precursor) is a broad term and shall be given its ordinary meaning, and will include, but is not limited to, a mixture of initial or starting ingredients (materials, compounds) capable of being converted into a geopolymer.

One or more embodiments of the present invention provide generally shaped particles and fibers and incorporating a geopolymer as its functional building block. Such geopolymeric materials serve as excellent reinforcement materials for composites due to the strength, chemical durability, and fire resistance of the geopolymer and the low cost of making such geopolymeric particles or fibers.

Although geopolymers do not have inherently a viscoelastic property, the inventors have discovered a method of introducing a viscoelastic-like behavior to a precursor formulation and through a controlled process, the precursor may be shaped into a pre-determined configuration, such as a particle, sphere, flake, fiber and the like and aggregates thereof. The inventors have also discovered a method of introducing one or more voids, pores or spaces while forming the precursor formulation into one or more shaped geopolymeric particles or fibers, thus advantageously providing low-density geopolymeric particles or fibers having all the valuable attributes associated with the geopolymer, the precursor formulation and the formed shape. Thus, by providing as a starting material a precursor formulation having one or more compounds therein capable of converting to a geopolymer, various attributes of the geopolymeric compounds, such as superior strength, thermal stability, high surface smoothness, precision and hardness, are thereby incorporated into the resultant geopolymeric product.

The term "geopolymer," first used in the early 1980's, refers to a synthetic amorphous polymer typically having a silicoaluminate (Si—Al) framework. The chemical formula for a geoplymer may be presented as:

$$M_n[-(SiO_2)_z-AlO_2]_n \cdot wH_2O \qquad (1),$$

where M is an alkali species and n is the degree of polymerization. This is an aluminosilicate framework in which the aluminum is mainly in the tetrahedral coordination and the silicon has a variety of coordination geometries. An alkali metal, M, such as sodium or potassium provides the charge balance. The structural unit may include a sialate [—Si—O—Al—O-], sialate siloxo [—Si—O—Al—O—Si—O-] and/or silate disiloxo [—Si—O—Al—O—Si—O—Si—O-].

Geopolymerization involves a chemical reaction between silicoaluminates and alkali silicate in a highly alkaline environment. The formation reaction for geopolymerization is generally known to be a rapid setting and rapid hardening reaction. Because of the rapid setting and hardening characteristics of geopolymerization, it has previously not been possible to shape a geopolymeric particle or fiber at the micro-scale level in order to produce useful products, such as particles or fibers of a predetermined and desired configuration.

With geopolymerization, an alkaline solution induces a certain number of Si and Al atoms to dissolve or hydrolyze from an aluminosilicate feedstock, forming geo-monomers in solutions, which then poly-condense to form rigid networks under the trigger of an applied heat. A cross-linking reaction is enhanced when multiple types of silicoaluminates are used in combination. The strength of the geopolymeric particles or fibers increase with increased cross-linking.

Geopolymeric compounds are chemically durable and stable. The precursor for geopolymeric compounds comprise at least one amorphous silicate, preferably in the form of aluminosilicate. Alumina may be present to form a stable geopolymer. The silicate is preferably alkali-activated by an alkali compound such as a hydroxide, silicate, or combinations thereof. The mole ratio of an alkali metal R, to Al may vary from 5 to 0.1, and more preferably from 3 to 0.2, and more preferably from 2 to 0.5. R may be selected from the group of alkaline metals, including sodium, potassium, lithium, and combination thereof. The mole ratio of Si to Al in the preferred geopolymer may vary from 300 to 1, preferably from 50 to 1, and more preferably from 10 to 1. In some preferred embodiments, the mole ratio of Si to Al is greater than about 2, more preferably greater than about 3. It is noted that a higher Si to Al ratio leads to a more flexible geopolymer product, which is particularly advantageous for products in the form of fibers.

Examples of suitable aluminosilicates are calcined kaolin type clays (2 $SiO_2 \cdot Al_2O_3$). Phosphate type clays, alumina silicate minerals and powdered rock type materials may also be successfully used to form a suitable geopolymer precursor. In addition, other clay materials (calcined or non-calcined), waste by-products such as fly ash, blast furnace slag, and waste glass may also be used to formulate a geopolymer precursor. A starting precursor material may also be a siliceous material, such as diatomaceous earth, silica fume, ground quartz and add to it an alumina bearing material such as bauxite, alumina, aluminates and alumina hydrates. Suitable materials become more reactive to alkali activation by size reduction, calcination and dehyroxylation. These materials, therefore, have a higher geopolymerization reaction rate.

Alumina phosphates may also be used as the geopolymeric precursor. Here, the mole ratio of P to Al may vary from 10 to 0.1, and more preferably from 5 to 1. Iron oxide-containing compounds (e.g., iron hydroxide) and boron-containing compounds (e.g., boric acid or borates) may also be added to a geopolymeric precursor formulation. The mole ratio of Si to Fe or B may vary. In one form it may be 300 to 1.

It will be appreciated that any alumina silicate or alumina phosphate geopolymeric precursor may be processed to form a shaped end-product (e.g., particle, fiber or light weight shaped article) comprising one or more geopolymeric compounds.

The average particle size of the silicate and/or aluminosilicate starting material is preferably under 300 microns, preferably, less than 100 microns, more preferably, less than 20 microns, and in some embodiments is under 5 microns.

In some preferred embodiments, a precursor for the shaped geopolymeric particles or fibers additionally and innovatively comprises a blowing agent. Blowing agents are generally known as materials that release a gas or produce a gas volume under certain trigger conditions. A blowing agent in a geopolymeric precursor promotes formation of gas voids, pores, spaces or a foam-like structure in the geopolymeric particles or fibers. The resulting geopolymeric product with voids, therefore, has a lower density than one with a substantially solid structure (i.e., absent or having limited gas voids, pores, spaces or a foam-like structure).

A blowing agent as used herein is preferably selected to be triggered by a change in the material property, process or a combination thereof. Examples of suitable trigger conditions include but are not limit to changes in temperature, pH, physical characteristic of the material (e.g., viscosity, phase change), an external physical change (e.g., shear rate) and chemical reaction (induced internally or externally), or combinations thereof. Metal powders, hydrocarbons and appropriate organic materials, carbonates/bicarbonates, nitrates/nitrites, sulfates/sulfites/sulfides, water, and other compounds that may generate gas upon exposure to high pH, heat, or a chemical reaction may be used as a blowing agent. Finely ground aluminum metal powder is an example of a blowing agent that produces hydrogen upon exposure to a high pH solution. Another example of a blowing agent is a gas pocket that expands upon heating. Yet another example of a blowing agent is chemically-bound water that coverts to steam upon heating.

A blowing agent suitable for forming shaped geopolymeric particles and fibers is selected with distinctly different criteria than a blowing agent used for forming other types of particle compositions, such as, for example a glass microsphere formed in a high temperature furnace. Because geopolymerizing reaction temperatures are significantly lower than those used for melting glass, a suitable blowing agent for use herein, if triggered by temperature, must also have a trigger temperature much lower than that required for glass. As an example, carbonated salt is triggered at a temperature below 300° C., which would not be suitable for a glass melting process which requires a temperature typically greater than about 800° C.

With geopolymerizing reactions, a blowing agent triggered by pH, requires the pH to be alkaline, often greater than 12, more often 14.

As described herein, a blowing agent must also be selected and controlled so that it is triggered while the geopolymeric precursor is undergoing a viscoelastic-like behavior, typically just before setting and hardening, so that, when desired, voids may be formed and preserved in the end-product.

A geopolymeric precursor is formulated to have a predetermined viscosity and curing time. In some preferred embodiments, the precursor formulation may further comprise a rheology modifier. Rheology modifiers are additives capable of changing a viscoelastic-like behavior of the material, such as flow, deformation, and/or spreadability. The viscoelastic-like behavior may be present in the precursor formulation itself or during the formation process. The quantity and type of rheology modifier is selected to achieve a predetermined viscoelastic-like behavior in the precursor at a predetermined time and for a predetermined length of time. Rheology modifiers may include natural gums (e.g., guar, starch), modified natural gums (e.g., cellulose derivatives), synthetic compounds (e.g., acrylic polymers), inorganic materials (e.g., clays or amorphous silicon dioxide in the form of hydrated or fumed silica), and commercially available rheology modifiers (e.g., styrene/acrylate, styrene acylamide, polyacrylate, including ones marketed under such trade names as ACUSOL®, RHEOLATE®, CARBOSOL®) and combinations thereof. In addition, water, polyethylene glycol (PEG), and sodium silicate may be useful rheology modifiers. With sodium silicate, the modifier is typically used in excess of typical amounts used for forming particles or fibers.

In some preferred embodiments, a geopolymeric precursor further comprises at least one calcium-containing material, such as calcium carbonate, lime stone, gypsum, blast furnace slag, kiln dust, calcium oxide, calcium hydroxide, cementitious material and combinations thereof. In addition, a filler material may be included. Incorporating filler materials improves economy by lowering cost and may also improve mechanical properties of the precursor and resultant composition as well as reduce their density. Examples of filler materials are polymers, cellulose or other natural fibers, and phosphate clays. When desired, a portion of one or more of the initial precursor materials, such as aluminosilicate, when not entirely converted during geopolymerization, will remain in the resultant geopolymeric products (e.g., particle or fiber) in the form of a filler.

Because shaped geopolymeric particles or fibers described herein are derived from a geopolymeric precursor formulation, the shaped end-products typically have substantially the same chemical composition as the precursor formulation on a dry basis. This is the result of mass conservation via the polymerization reaction (with the exception of the evaporation of water and small quantities of alkali metal through the vapor phase as well as the loss/escape of some gas from a blowing agent, when used). Similarly, shaped geopolymeric particles and fibers inherit substantially all the advantageous properties of typical alkali-activated aluminosilicates. Shaped products as discussed herein exhibit excellent chemical durability in both acidic and alkaline environments. In particular, they are found suitable for use in concrete and cementitious composites.

A resultant geopolymeric particle or fiber will have a different structure than its initial precursor formulation, because geopolymerization provides a cross-linking network. It is preferable that the amount of geopolymer in the resultant composition is greater than 5% by weight, more preferably 10 wt. %, more preferably 20 wt. %, more preferably 35 wt. %, more preferably 50 wt. %, and more preferably 70 wt. %, and most preferably 90 wt. %. When aluminum is present in the precursor formulation, the mole ratio of alkali metal R to Al in the resultant geopolymeric composition may vary from 5 to 0.1, and more preferably from 3 to 0.2, and more preferably from 2 to 0.5. R typically includes alkaline metals, such as sodium, potassium, lithium, and combinations thereof.

In some preferred embodiments, the shaped geopolymeric particle or fiber has a heterogeneous structure. When aluminum is present in the precursor, some of the alumina silicate generally remains unreacted or inactivated. In some embodiments, the resulting geopolymeric particle or fiber is in a multi-phase form having various crystalline and/or amorphous phases. For example, some crystalline phases of zeolite may present in small quantity in a geopolymeric composition, microparticle or fiber.

Shaped geopolymeric particles and fibers produced herein may be in any of a number of forms, such as, but not limited to, a powder, sphere, fiber, filament, substantially round particle, flake or the like and aggregates thereof. The dimension of a shaped particles and fibers produced herein may preferably be greater than about 0.1 µm, more preferably greater than 10 µm, more preferably greater than 30 µm, more preferably greater than 100 µm. It is noted that when using the term "micro," such terminology does not limit the dimension of the particles or fibers produced herein to a micron size. In some preferred embodiments, resultant geopolymeric particles and fibers may have a dimension of 50 mm or greater. In other preferred embodiments, geopolymeric particles and fibers produced as described herein may have a dimension as small as 10 nm or less. In some embodiments, final shaped geopolymeric particles or fibers or other such desired shapes may not be limited in their overall length and/or dimension.

The presence of a geopolymer may be detected and quantified in the final shaped product by any suitable technology. One such technology includes Fourier Transform Infrared Spectroscopy (FTIR). It has been found previously that geopolymetric matrices are identified by FTIR at a peak at ~460 cm$^{-1}$ (assigned to in-plane bending of Al—O and Si—O linkages) and a peak at ~1000 cm$^{-1}$ (representing fusion of both Al—O and Si—O asymmetric stretching). While other peaks are also useful, these two peaks serve as the primary fingerprint for identifying geopolymer matrices and may indicate the extent of polysialation.

Solid-state Magic-Angle Spinning Nuclear Magnetic Resonance Technique (MAS NMR) is also suitable for identifying polymerization of geopolymers. The $^{27}$Al spectrum of a geopolymeric compound shows a strong resonance at around 58 ppm, which is an indication of the predominant tetrahedral Al in a well-ordered geopolymer structure. XRD may also be used to determine the amount of crystalline and amorphous phases present in the composition.

In one or more embodiments, shaped geopolymeric particles and fibers produced as described herein are hollow or have one or more voids, typically comprising pores, spaces or a foam-like structure. A void may be centrally located and/or include air voids around the central void. To provide voids, hollow or foam-like structures, a geopolymeric precursor formulation includes a blowing agent (previously described). The shaped geopolymeric particle or fiber with a void(s), hollow or foam-like structure advantageously has a lower density and different sound, heat and load transfer mechanism than a similar sized particle having a substantially solid structure. Shaped geopolymeric particles or fibers having voids, hollow or foam-like structures, therefore, provide multiple functions because of such properties, and are, thereby, suitable for a wide range of applications, such as for density modification, packing, sound proofing, and insulation. Whereas a solid geopolymeric material generally has a density of greater than 2.00 g/cc, geopolymeric products having one or more voids as described herein advantageously offer a density of less than about 1.70 g/cc, more preferably 1.00 g/cc, more preferably 0.45 g/cc, more preferably 0.35 g/cc, more preferably 0.30 g/cc, most preferably 0.25 g/cc.

One preferred configuration of a shaped geopolymeric particle is that of a hollow microsphere. A hollow geopolymeric microsphere may have a substantially spherical shape defined by a wall surrounding a void space. The wall thickness preferably ranges from 0.1 to 45%, more preferably from 1 to 35%, more preferably from 10 to 25% of the microsphere diameter. The void space may be preferably centrally or non-centrally located within the microsphere so that the wall thickness is substantially uniform all around the microsphere providing even load distribution to the microsphere when used.

Another preferred configuration for a geopolymeric particle is a substantially spherical shape with more than one internal void. In some embodiments, a geopolymeric particle or fiber may have a foam structure. Voids may be in an open or closed structure. Having void spaces within hollow and/or foam-like structures directly reduce the density (e.g., effective average density and bulk density) of the shaped geopolymeric particle or fiber. Indeed, while a solid geopolymeric material generally has a density of greater than 2.00 g/cc, a shaped geopolymeric material with voids, hollow and/or foam-like structure advantageously has a density of less than about 1.70 g/cc, more preferably 1.00 g/cc, more preferably 0.45 g/cc, more preferably 0.35 g/cc, more preferably 0.30 g/cc, most preferably 0.25 g/cc.

A shaped geopolymeric material produced as described herein may also be engineered to have a non-spherical shape in which the aspect ratio is greater than about 1.0 in at least one dimensional plane. More preferably, the aspect ratio is greater than 1.10, more preferably greater than 1.20, more preferably greater than 1.40, more preferably greater than 1.70, more preferably greater than 2.10, more preferably greater than 2.50. For example, a donut shape may be formed using a thermal spraying process. The donut shape is formed when there is a rapid and large water evaporation during processing, which may be engineered by controlling the inlet and outlet temperatures of the spraying process and the water content of the precursor formulation. A multi-edged shape may be obtained by firstly forming a fiber using a spinning or extrusion process, using a suitable multi-edged die design, then secondly chopping the fiber into short lengths to form the particles. A multi-edged shape may also be formed by intersecting multiple fibers from multiple angled fiber-forming dies just before completion of the geopolymerization reaction; setting and hardening, and then chopping the intersected and intertwined fibers into short multi-edged particles. Both continuous and chopped fibers may be produced.

Yet another shape includes spikes on the surface of the formed geopolymeric particles or fibers. One method of forming such a shape includes initially forming a geopolymeric microsphere, then subjecting the microsphere to a high pH, high temperature and high pressure environment, such as that in an autoclave. Under these conditions, parts of the geopolymeric microsphere are leached away and other parts may convert to one or more crystalline phases, such as those of zeolites, leaving a particle with a spiky morphology and shape.

Preselected configurations may include substantially, round, spherical, donut-shaped, oval, elongated, tubular, square, polygonal and varying combinations thereof. Shapes may be also be sheet-like. A variety of engineered shapes are advantageous for one or a number of useful applications. For instance, spiked or multi-edged geopolymeric particles provide enhanced locking property within a matrix. Particles are often useful in filler applications.

Shaped geopolymeric particles and or fibers are particularly useful in layered structure, wherein at least one of the layers comprises the geopolymeric product, such as in an exterior layer as a coating or cladding or in an enclosure shell or core layer. In another preferred embodiment, the geopolymeric compound is in the core layer, enclosed or cladded by at least one layer of a different material. Shaped geopolymeric particles and fibers may, themselves, be multi-layered. In all the above conditions, the resulting shaped particles or fibers have substantially all the inherent properties of the geopolymeric compounds used in the precursor formulation while also have other advantageous attributes, such as that provided by the shape, itself. For example, some shapes offer superior interlocking properties in the material, in the composite matrix, or surface inertness.

When one or more shaped geopolymeric particles and/or fibers are incorporated in a composite, the composite may be in any desirable form, such as a panel, board, post, siding, plank, or other suitably shaped article. Shaped geopolymeric particles or fibers may be incorporated for their shape, property as well as for use as a filler, coating, substrate for pigment (e.g., colorant in road signs), and in cement slurries, to provide a few examples. Shaped geopolymeric products, when in the form of a fiber, may be used in fiber reinforced composite materials, such as in a polymer-, metal-, and cement-matrix fiber reinforced composite. Such compositions are suited for use in place of glass, ceramic and/or carbon fibers when desired.

Some preferred embodiments provide shaped geopolymeric particles and/or fibers for one or more functional uses, such as an abrasive, for polishing and/or hydraulic fracturing applications. Such geopolymer compositions advantageously have shape, size, density, and surface properties suitable for superior flowability. As an example, spherical or substantially round microparticles with a smooth surface area and a low density offer superior flowability for liquid polishing applications. In one preferred embodiment, geopolymeric compositions in the form of one or more fibers are incorporated for making a cloth, fabric, sponge, carpet or the like. Such a cloth or sponge incorporating geopolymeric fibers may be used alone or in combination with additional materials for packing, filter, gasket, insulation, for high temperature uses and/or fire-proofing applications.

Also provided are light weight shaped articles, each incorporating one or more shaped geopolymeric particles and/or fibers with or without voids therein. The voids may be substantially discrete voids (e.g., pores, spaces), a network or a foam-like structure. In a preferred embodiment, a precursor formulation for use in light weight articles will comprise at least one blowing agent, the blowing agent promoting formation of voids, networks and/or foam-like structures, which advantageously reduce the apparent density of the resultant articles. Such light weight articles may be in any of a number of forms, such as, but not limited to, a panel, board, post, plank, pipe, container, fire-proof safe, hardware, filing cabinets, exterior shells for vehicles or air planes.

The method of making shaped geopolymeric particles and fibers described herein is discussed further, which include alkali activated silicates with or without rapid setting and hydraulic cements. Shaped geopolymeric particles and fibers are made in two primary phases: a first phase, in which a precursor formulation with a geopolymeric compound is provided and a second phase, in which the precursor formulation is used to form the shaped geopolymeric end product.

In the first phase, a precursor formulation is provided by combining at least an aluminosilicate source and an alkali source in the form of a hydroxide, silicate or combination thereof. By preselecting a desired formulation, the viscosity may be controlled, thereby controlling the shape of the resultant material by. In the second phase, a geopolymerization reaction occurs in which the geopolymeric precursor formulation is processed by a specific method that further controls viscosity, such as thermal spraying, melt spinning or a blow process. Shaping and/or forming of voids as well as drying (curing) occur during the second phase. Preselecting process parameters control material viscosity directly by affecting process time and curing time. Hence, precursor formulations and process parameters are predetermined to achieve a desired shaped geopolymeric particle or fiber. In some preferred embodiments, the material viscosity is controlled to a sufficiently low value during the second phase to allow appropriate shaping of the resultant product. In addition, curing time is sufficiently long to allow the shape to form before the resulting product is set and cured.

In the first phase, it is essential that the precursor formulation have a viscoelastic region that may be exploited to form, shape and solidify the formulation in sequence. This is akin to glass that exhibits viscoelasticity, is shaped in the molten state and then solidifies to retain substantially the same shape when cooled below the glass softening temperature. And this is different from a sol-gel formation where shaping is formed by molding a very low viscosity compound into a final shape. Sol-gel formation may resemble forming a shaped ice cube from a water and sand mixture. One way of controlling the viscoelastic-like behavior of the precursor is by slowing down the reaction rate of polymerization during the second phase. A slower reaction rate has been found to result in a more organized polymer structure in the resultant product. One way to control the reaction rate is by controlling the reaction temperature. It has been found that the higher the reaction temperature, the higher the reaction rate. It has further been found that the reaction rate may also be controlled by dictating that particle size distribution in the precursor formulation. A finer particle size in the precursor has a higher surface area, and therefore a higher contact area for a reaction to take place, which leads to a faster reaction rate. The reaction rate may also be controlled by controlling the concentration of the alkali solution provided for activation. It has been found that the higher the alkali concentration, the faster the reaction rate.

In one preferred embodiment, starting materials for the precursor are batched separately and mixed in line in the first phase, wherein the starting materials include aluminosilicate(s), alkali activator(s), and optionally blowing agent(s). As an example, an aluminosilicate material may be depicted as part A and an alkali activator as part B. A blowing agent may be batched separately from another raw material stream as part C. As an alternative, the blowing agent may optionally be a component of part A or part B. When a blowing agent is not included, dense solid compositions are formed.

In one preferred method, part A and part B are batched into a feed line and homogenized thru an in-line mixer. Part C is then added to the mixture of A and B. In the second phase, a resulting slurry may be processed (e.g. sprayed into a reactor, exposed to blowing and/or spinning) to form hollow spheres or particles with voids. Alternatively, the resulting slurry is air dried or dried using a suitable techniques known to one of ordinary skill in the art, the processed product which may then undergo a size reduction by milling, grinding or a similar and suitable techniques known to one of ordinary skill in the art to form a geopolymeric end-product, such as particles in a powder form. In yet another embodiment, the second phase may involve blowing and/or spinning the precursor into fibers in a heated chamber to remove excess water and to cure the fibers.

As described herein, the second phase may be carried out in batch mode, continuous mode, or semi-continuous mode. In still another embodiment, the first and second phase may be carried out simultaneously.

In the second phase, geopolymerization may be carried out at a non-elevated temperature. A suitable temperature range is between about 50 and 600° F. The geopolymerization process may also be carried out at lower temperatures, such as room temperature. In addition, the second phase may be staged (e.g., using one or a number of temperatures in stages). In one example, a second phase may include a temperature of 70° F. in which viscoelastic behavior and shaping occurs, then 110° F. to accelerate geopolymer formation after shaping, followed by 300° F. for final drying of excess water. As such, one or more temperatures are selected to help control the rate of geopolymerization.

When undergoing the drying portion of the second phase, the geopolymerization reaction must first be complete. This is because geopolymerization reactions favor the presence of some moisture. It has been found that when drying occurred too early (before geopolymerization was complete), the resulting geopolymer composition did not form into geopolymeric microparticles or fibers, but formed a fine, dry crumble of raw materials. Without being bound by theory, it is speculated that moisture mobilizes alkali metal cations, allowing them to move to the correct position and to balance the charge for the aluminum in the tetrahedral configuration.

In one preferred embodiment, a precursor formulation is provided in the first phase. Optionally and as an alternative, a precursor formulation is provided with one or more additional materials (e.g., additives), that include, but are not limited to one or more blowing agents, one or more rheology modifiers (e.g., cellulose derivatives, acrylic polymers, clays, hydrated or fumed silica, commercial rheology modifiers), one or more calcium-containing compounds (selected preferentially from a cementitious compound, calcium carbonate, lime stone, gypsum or combination thereof), and one or more filler materials (e.g., polymers, cellulose or other natural fibers, phosphate clays minerals, fine silicates such as silica fume, carbon based materials, etc). Such additives may be provided in the first phase or second phase, may be present in the aluminosilicate source or the alkali source or a combination thereof.

When providing a precursor and a blowing agent, the blowing agent is preferably selected to include a trigger that produces a gas that is entrapped in the viscous geopolymer material and results in cellulation. The term "cellulation" as used herein refers to the formation of one or more voids, pore structure or foam-like structure. The cellulation process may occur in the bulk of the viscous polymer before or during the second phase. In another embodiment, cellulation occurs in a continuous manner, thus, in phase 1 and phase 2 (i.e., prior to, during and post processing/formation of the resultant product).

According to the improved methods described herein, following formation of discrete geopolymeric end-products (e.g., particles, fibers) in their desired shape and structure, the products rapidly harden by a geopolymerization reaction to retain their shape thereafter, even with subsequent collection and handling operations.

Shaped geopolymeric particles and fibers may be formed in the second phase using processes such as spraying and thermal spraying, which atomizes a precursor slurry to form discrete particles or agglomerates. Atomization in a spraying device produces near round and generally spherical particles. With addition of a blowing agent, the particles hollow shaped particles are formed. When a blowing agent is not used, substantially solid spheres result from thermal spraying. Surprisingly, thermal spraying was found by the current inventors to be particularly useful, because viscosity of the geopolymeric precursor may be kept low enough for forming shaped particles. In addition, the applied heat promotes evaporation of excess water and polymerization and hardening of the shaped particles in a controlled manner. With thermal spraying, heat may also trigger the blowing agent (when present). In one preferred embodiment when a blowing agent is present, hardening preferably occurs after, and more preferably immediately after, a triggering of the blowing agent. The controlled timing of hardening after triggering ensures that any desired voids, pore networks or foam-like structures are retained in the resultant shaped geopolymeric particles, thus taking full advantage of the blowing agent. For example, a slurry of a geopolymeric precursor may be atomized in a spray dryer where the applied heat triggers the blowing agent(s) in the precursor to form a gas, thus generating gas voids or spaces in the material structure. The applied heat also activates polymerization and hardening of the precursor material, and retains voids in the resulting geopolymeric particle or fiber. The amount and type of the blowing agent, as well as the spraying conditions may be configured to produce a desired void structure in the shaped geopolymeric particle or fiber. The inventors have discovered that the most efficient cellulation takes place when the geopolymeric precursor is in a viscoelastic regime (e.g., a majority of gas evolved by the blowing agent is captured within the cellulating particle).

Atomized droplets of the slurry are dried in a spray dryer for a predetermined residence time. The residence time may affect the average particle size, the particle size distribution and the moisture content of the resultant products. The residence time is preferably controlled to give one or more preferred characteristics, as described above. The residence time may be controlled by water content of the slurry, slurry droplet size (total surface area), drying gas inlet temperature, gas flow pattern within the spray dryer, and particle flow path within the spray dryer. Preferably, the residence time in a spray dryer is in the range of about 0.1 to 10 seconds, although relatively long residence times of greater than about 2 seconds are generally more preferred. Preferably, the inlet temperature in the spray dryer is in a range of about 200 to 600° C. and the outlet temperature is in a range of about 90 to 350° C.

It has been found that by controlling the spray drying conditions, the average particle size of the particles and the particle size distribution may be controlled. For example, a rotary atomizer has been found to produce a more uniform particle size distribution than a pressure nozzle. Furthermore, rotating atomizers allow higher feed rates, suitable for abrasive materials, with negligible blockage or clogging. In some embodiments, a hybrid of known atomizing techniques may be used in order to achieve particles having the desired characteristics. Spray drying advantageously produces materials having a narrow particle size distribution. Consequently, resultant engineered geopolymeric particles processed by spray drying will have a narrow particle size distribution and consistent properties for subsequent use. Particles according to certain preferred embodiments of the present invention may have open or closed porosity after thermal spraying and hardening.

It is further possible to spray the geopolymer in a controlled atmosphere chamber to facilitate hardening and shaping of the droplets. The chamber atmosphere may be rich in a gas or vapor that catalyzes polymerization. For example, a chamber atmosphere may be rich in $CO_2$, or steam.

According to another method of the present invention, multiple geopolymeric compounds, or a geopolymeric compound and other materials are co-sprayed to form multilayer composite particles. This may be achieved by viscous encapsulation or elastic layer rearrangement to form sealed skin hollow, porous or solid particles. The co-spraying materials preferably have different viscosities. In one preferred embodiment, the viscous geopolymer that contains the blowing agent forms the porous core surrounded by a solid cladding of a second geopolymer. The second geopolymer has preferably a lower viscosity than the core geopolymer to promote an even exterior layer.

In one preferred embodiment, the second phase involves blowing/spinning/drawing the geopolymeric precursor of the first phase into fibers or process the precursor to make flakes. The fiber strands may be continuous or chopped. Standard fiber forming techniques may be used to manufacture geopolymeric fibers. The formation mechanism according to the preferred method of the present invention is again by rapid drying, and polymerization of the viscous geopolymeric compounds. In one embodiment, the viscous geopolymer is spun to form short fibers. In another embodiment, the fibers are formed by blowing compressed air against a stream of viscous geopolymer liquid in a conventional fiber blowing equipment used routinely in the glass fiber industry. The fiber dimensions and aspect ratio may be fully controlled for any specific application.

In one preferred embodiment, the second phase involves forming a light weight shaped article from the precursor material formulation of the first phase by any suitable techniques. The precursor material preferably comprises at least a blowing agent. In one preferred embodiment, phase two of the method involves pouring the precursor material of the first phase into a mold, then air dried or oven dried to form the shaped article. In another preferred embodiment, the precursor material is cured then cut to desired shape and size to form the shaped article. In another preferred embodiment, both phases are carried out simultaneously using suitable techniques known to one of ordinary skill in the art, for example using a screw extruder, with optional heating. The novel use of a blowing agent with one or more geopolymeric compounds promotes formation of voids, pore network and/or foam-like structure, advantageously reduces the apparent density of the resulted articles. The light weight geopolymeric shaped articles may be of various forms, such as, but not limited to, panel, board, plank, post, pipe, container, fireproof safe, filing cabinets, and exterior shells for vehicles or air planes.

To produce geopolymeric fibers, it is preferable that the precursor material is prepared in the form of a slurry or paste suitable for producing stable jet length. It has been found that the condition of the stable jet length for conventional fibers also applied to the formation of geopolymeric fibers. Known theory of stable jet length for conventional fiber formation is given by a combination of Weber number and Reynolds number, which are characterized by the jet velocity, diameter, slurry density, viscosity, and surface tension. A precursor in the form of a slurry is formulated to have a desired density, viscosity and surface tension to produce a selected stable jet length condition. For instance, additional fillers, such as ground fly ash, may be added to alter the slurry density and viscosity. A surfactant or different fluid may be added to the slurry to change the slurry surface tension and viscosity. It is preferable that the precursor slurry for making geopolymeric fibers have the Reynolds number of lower than about 1500, more preferably lower than about 1000, and most preferably lower than about 800.

Hollow geopolymeric fibers may be formed by a precision nozzle in which the ingredients are mixed together at the point at which they leave the nozzle. One phenomenon that can be utilized in fiber drawing involves the imbalance between the pressure distribution in a spinning fluid and the stationary base plate. The fluid next to the base is stationary and therefore the centrifugally-derived pressure gradient is not balanced by the motion; therefore, heavy particulates move towards the centre of the base plate. This concentrates the solids and brings them close together, allowing the reaction to take place.

Figure 2:
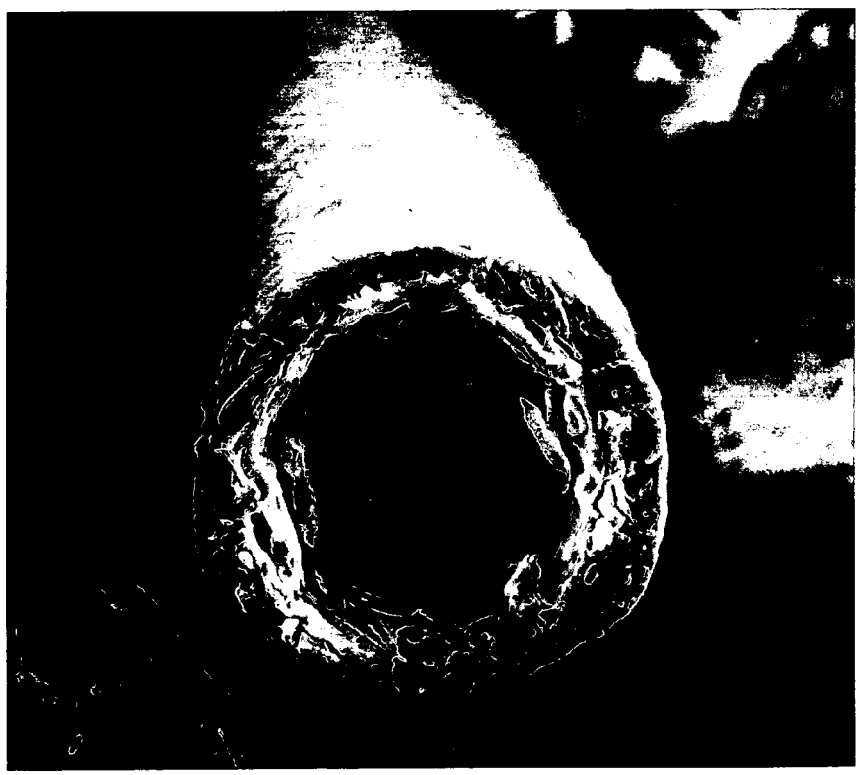
FIG. 2 depicts an optical image of a geopolymeric fiber formed from the nozzle design of FIG. 1.
Figure 3:
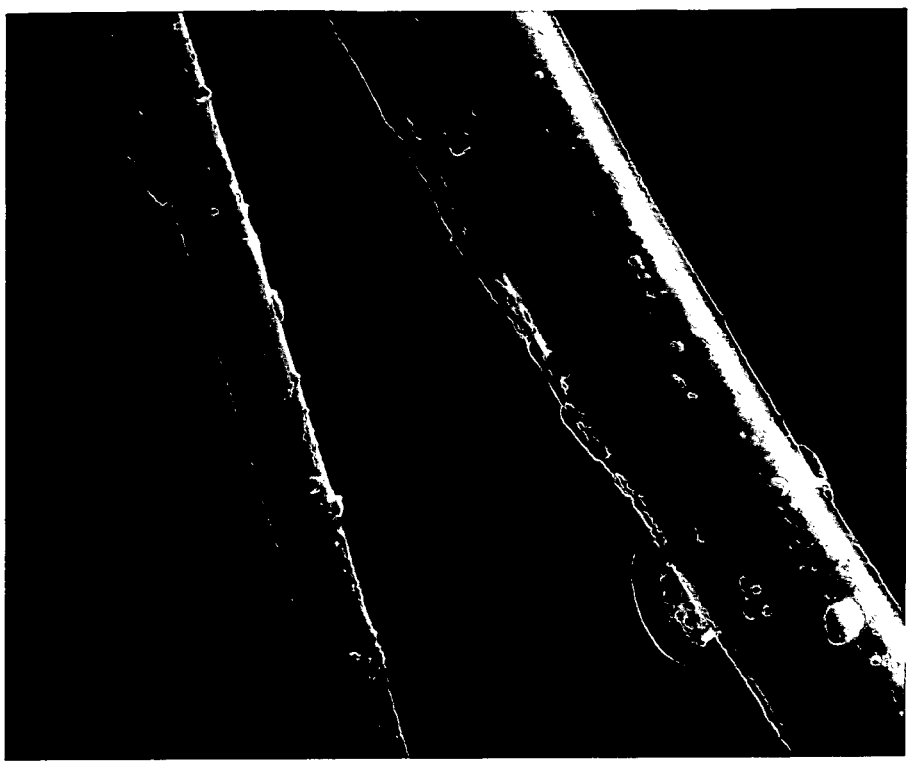
FIG. 3 depicts an optical image of two geopolymeric fibers formed from the nozzle design of FIG. 1.

Another nozzle design that can be used for forming geopolymeric fibers as shown in FIG. 1. The nozzle design as shown injects the precursor slurry through a die surrounding an air injection, thus forming a round hollow fiber. FIGS. 2 and 3 show some examples of fibers formed from a nozzle design of FIG. 1.

Of particular note, geopolymeric formulations as disclosed and manufactured herein may result in the formation of a geopolymeric flake. As used herein, unless otherwise noted, a flake is also a particle that has a breadth and a uniform thickness to a some extend, wherein the breadth is substantially larger than the thickness. In many embodiments, a flake has an irregular outer profile in plan view.

Flakes may be prepared, for example, by forming a thin geopolymeric sheet and then dividing the sheet into smaller particles. One method of forming a geopolymeric sheet is by delivering a geopolymeric precursor through counter-rotating rollers. The process may be subjected to heat to enhance the geopolymerization reaction. In one preferred embodiment, the methods described above produce a geopolymeric sheet and resultant flakes having a cross-sectional dimension corresponding to the spacing of the rollers, which in some cases, may be on the order of about 1-3 µm.

Another suitable method involves extruding the geopolymeric precursor through an appropriately sized die, using a suitable temperature and atmosphere for geopolymerization. By such methods, the thickness of the geopolymeric end-product is determined by the spacing of the rollers or by the geometry of the die. According to such methods of producing geopolymeric flakes, the thickness of the flakes may be infinitely varied and any desired value to suit the final use requirements for the flakes. Many uses for flakes typically require a thickness of less than about 1000 µm. As such, flakes are generally produced having a thickness of less than about 1000 µm, and in other embodiments, the thickness is less than about 500 µm, 250 µm, 100 µm, 50 µm, 20 µm, 10 µm, 5 µm, 2 µm, and 1 µm.

In yet another method for producing geopolymeric flakes, a slurry of the geopolymeric precursor is sprayed into the air. For example, the slurry may be sprayed through an appropriately shaped nozzle that forms geopolymeric flakes into a suitable shape.

Geopolymeric flakes produced according to any suitable methods described herein may be further processed to result in a desired dimension by one or more crushing techniques, such as ball milling, for example (or other suitable processes); the technique generally designed to reduce the geopolymeric flake to a smaller size. In one specific embodiment, flakes are processed to have a breadth of between about 10 and 10,000 µm and a thickness of between about 1 to 10 µm.

According to still another method of producing geopolymeric flakes, geopolymeric particles or spheres are produced (as described elsewhere herein) and the resulting particles or spheres are crushed or otherwise fractured to result in semi-spherical flakes. Semi-spherical flakes will naturally have a curvature in one or more directions; notwithstanding, the flakes may be dimensioned such that the flakes exhibit a desired functional or aesthetic characteristics. One approach to simulating a planar flake (such as those produced from a large flat sheet of geopolymeric) is to reduce the breadth of the flake to a small size relative to the starting sphere diameter. As the ratio of flake breadth to sphere diameter approaches zero, the flakes approach a planar geometry.

In one preferred embodiment, a sphere having a diameter of between about 30 and 1000 µm is fractured to produce flakes having a breadth of between about 5 and 200 µm in size. The thickness of the resulting flakes is dependent upon the wall thickness of the sphere, and in many embodiments, the thickness of the resulting flakes may be on the order of about 0.5 µm to about 10 µm.

Several methods for manufacturing flakes from materials such as organic polymers and glass are taught in the relevant literature, some of which are suitable for including herein. The unique geopolymeric formulations and control of geopolymerization reaction as disclosed herein are then included to provide unique geopolymeric flakes.

Example 1

In a first example, a precursor is formulated to have a predetermined curing time for a given intended process condition. All precursors in this example were formulated from Metakaolin clay, sodium hydroxide, sodium silicate and water, but provided in different proportions, using different processing temperatures, and/or with different curing times.

At least four geopolymeric precursor formulations were prepared, each by mixing 15 g of sodium hydroxide pellets with 32.5 g of liquid PQ Corporation N-type sodium silicate, followed by the addition of water to form a mixture. The amount of water for each formulation is shown in TABLE 1. Heat was generated due to the exothermic reaction of sodium hydroxide with water. The mixtures were then cooled to a given temperature, as shown in TABLE 1, and followed by the addition of 40 g of metakaolin clay. The composition of the clay, as determined by XRF, is shown in TABLE 2. Each formulation had a different cure time, as shown in TABLE 3.

TABLE 1

Formulations 1A to 1D (in grams)

| Formulation | Sodium Hydroxide (g) | Sodium Silicate (N-type) (g) | Water (mL) | Temperature of Alkali silicate, when added (° C.) | Metakaolin (g) |
|---|---|---|---|---|---|
| A | 15 | 32.5 | 10 | 100 | 40 |
| B | 15 | 32.5 | 25 | 75 | 40 |
| C | 15 | 32.5 | 25 | 25 | 40 |
| D | 15 | 32.5 | 50 | 25 | 40 |

TABLE 2

Composition of metakaolin clay

| $SiO_2$ | $Al_2O_3$ | $Fe_2O_3$ | CaO | MgO | $Na_2O$ | $K_2O$ | LOI |
|---|---|---|---|---|---|---|---|
| 552.2 | 41.4 | 00.5 | 00.1 | 00.3 | 00.01 | 10.7 | 30.8 |

TABLE 3

Cure time (in minutes)

| | Formulation | | | |
| | A | B | C | D |
|---|---|---|---|---|
| Cure time (minutes) | 2 | 4 | 30 | 60 |

As shown above, B and C both have the same formulation but different temperatures when metakaolin was added, which resulted in different curing time. Samples C and D, on the other hand, had the same temperature when metakaolin was added, but different amounts of water in the formulation, resulting in different curing time. Therefore, as illustrated in this example, both the formulation and process parameters were manipulated to achieve a predetermined curing time.

Example 2

Figure 4:
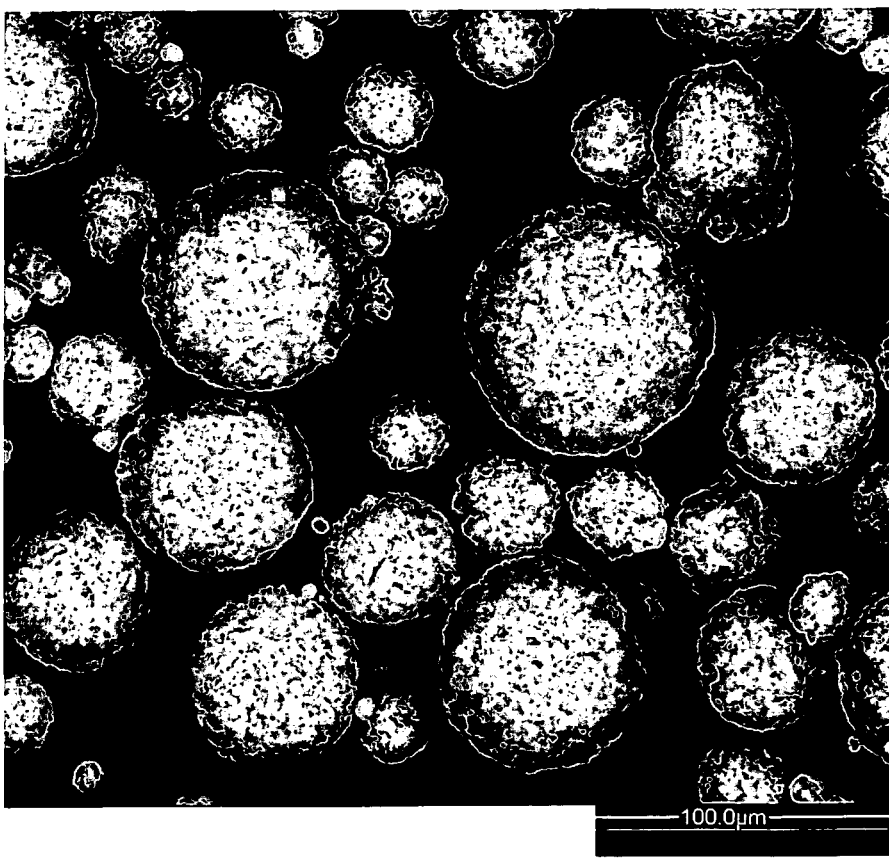
FIG. 4 depicts an optical image of shaped geopolymeric microspheres.

This example illustrates a method of making substantially spherical geopolymeric particles. A precursor was made by mixing 150 g of sodium hydroxide pellets with 325 g of liquid PQ Corporation N-type sodium silicate, followed by the addition of 400 g of water to form a mixture. Heat was generated due to the exothermic reaction of sodium hydroxide with water. The mixture was cooled to 25° C. and then added with 400 g of metakaolin clay. The mixture was thoroughly mixed using a mechanical mixer. The precursor mixture was in a slurry form and atomized into discrete droplet particles in a spray dryer. The applied heat in the spray dryer evaporated the excess water and activated polymerization and hardening. The droplet particles were converted to dried geopolymeric spherical and near round particles. The resulting geopolymeric particles are shown in FIG. 4. The resulting geopolymeric particles were found to have excellent properties, including flowability, strength, and durability, and hence perform as an excellent reinforcement filler.

Figure 5:
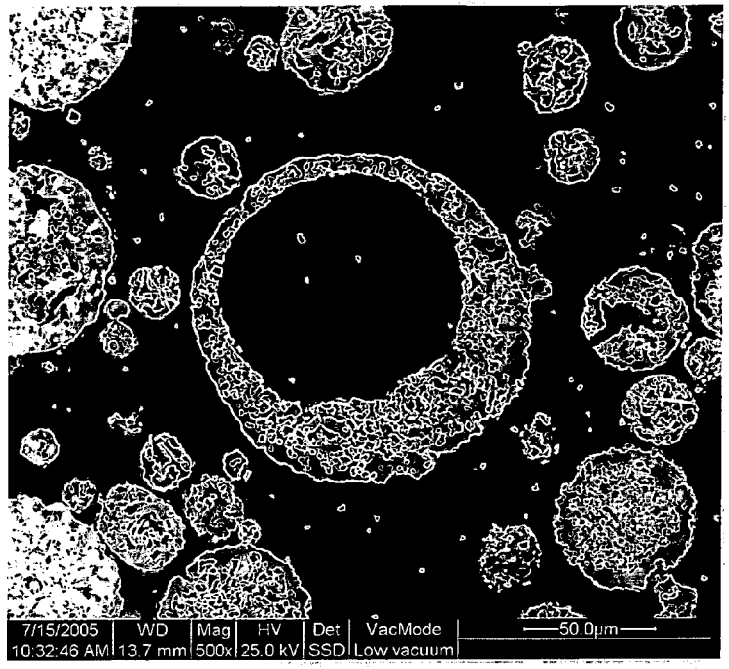
FIG. 5 depicts a scanning electron micrograph (SEM) image of a polished section comprising geopolymeric microspheres.

Furthermore, and surprisingly, it was noted that few of the particles contained rounded voids in their structure, for example as shown in FIG. 5. The rounded shape of the void suggested that a gas volume was created or increased, and then restrained and retained by the hardening action. Without being bound by theory, it may be speculated that chemically-bound water was released due to heat and formed vapor spaces, that were retained as rounded void spaces in the formed particles. As such, this example further indicates that a geopolymeric precursor may be engineered to incorporate one or more blowing agents to form light weight geopolymeric particles with specified degrees of hollowness or foam-like structures.

Example 3

Figure 6:
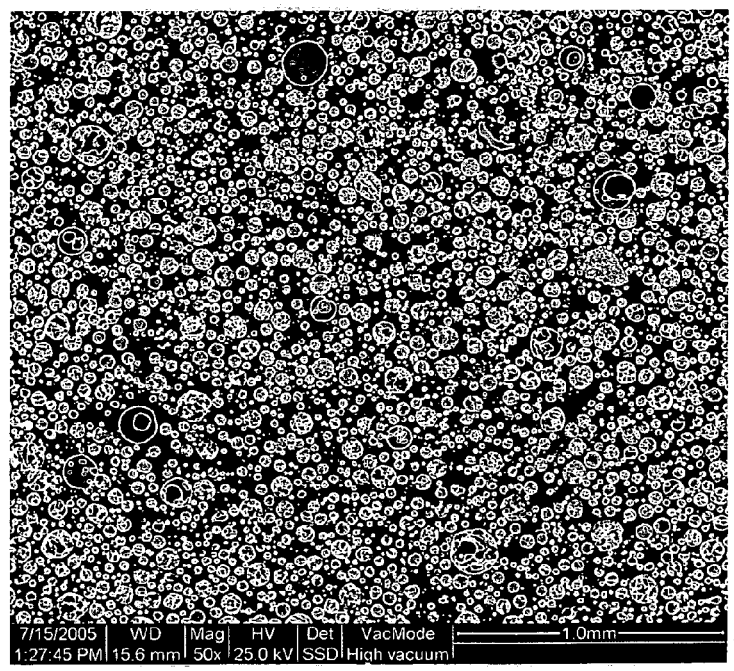
FIG. 6 depicts an optical image of geopolymeric particles.

In this example 4 g of zinc metal powder was deliberately incorporated as a blowing agent into the precursor formulation of Example 1. As a blowing agent, zinc metal powder autogenously reacts with water, releasing hydrogen gas. Following the same method of making of Example 1, the resulting product was light weight geopolymeric microspheres, in which most of the spheres contained rounded voids inside them. A representative example of the geopolymeric end-product of this example is shown in FIG. 6.

Example 4

Figure 7:
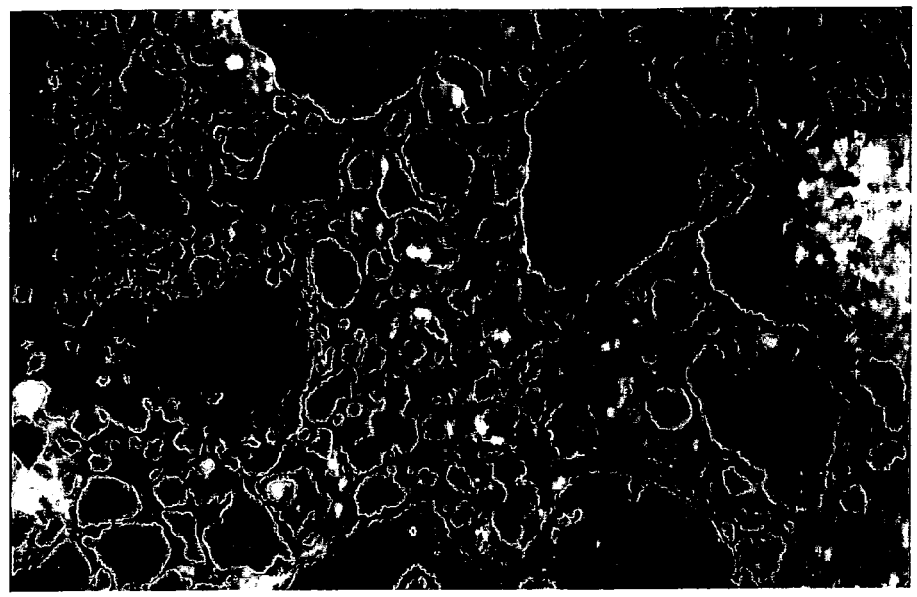
FIG. 7 depicts an optical image of a foamed structure of a geopolymeric particle.
Figure 8:
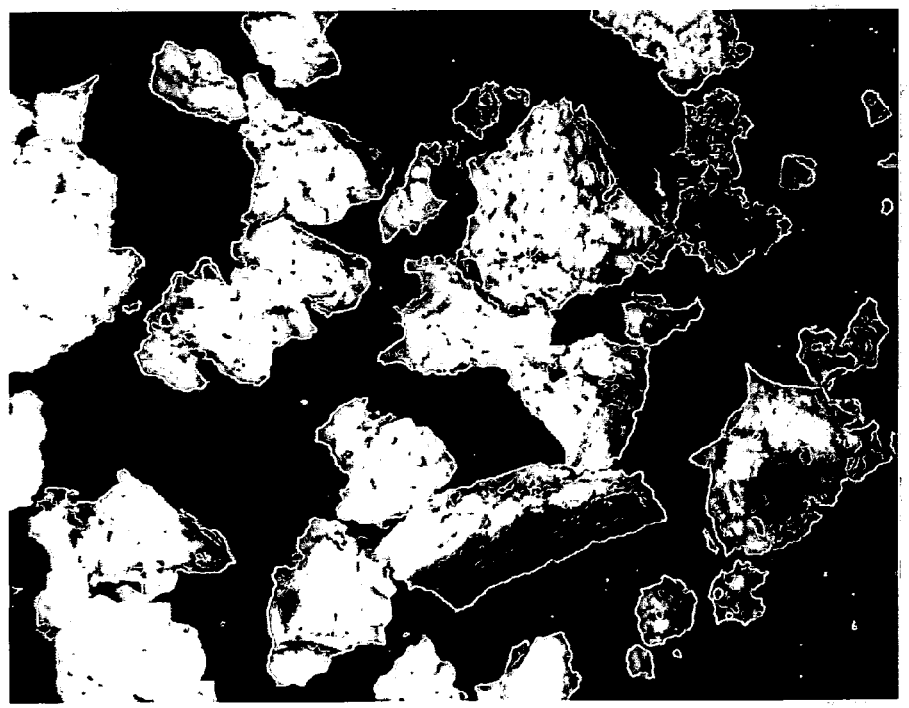
FIG. 8 depicts an optical image of foamed geopolymeric particles.

This example illustrates a method of making geopolymeric particles having a foam-like structure using aluminum metal powder as a blowing agent. A precursor was prepared by mixing 15 g of sodium hydroxide pellets with 32.5 g of liquid N-type sodium silicate followed by the addition of 25 g of water to form a mixture. Heat was generated due to the exothermic reaction of sodium hydroxide with water. This mixture was cooled to 25° C., then added with 40 g of metakaolin clay and thoroughly mixed using a mechanical mixer. The blowing agent, 0.4 g aluminum metal powders, was then added to the precursor mixture 5 minutes after the addition of the alkali silicate. The aluminum powder reacted vigorously and exothermically with water, releasing heat and hydrogen gas. The mixture, therefore, showed a bubbling behavior as if boiling because some of the hydrogen gas was breaking through and escaping from the mixture's free surface. Polymerization and hardening occurred autogenously due to the released heat, without additional applied heat. After hardening, the precursor mixture had converted to light weight geopolymeric particles and aggregates, the particles and aggregates having a foam-like structure. The aluminum powder, being highly reactive with water, generated hydrogen gas so vigorously that the precursor, while hardening, was broken up into aggregates, small pieces and discrete fine particles. An example of a resulting foam-like structure and particles as shown in FIG. 7 and FIG. 8, respectively.

Example 5

Figure 9:
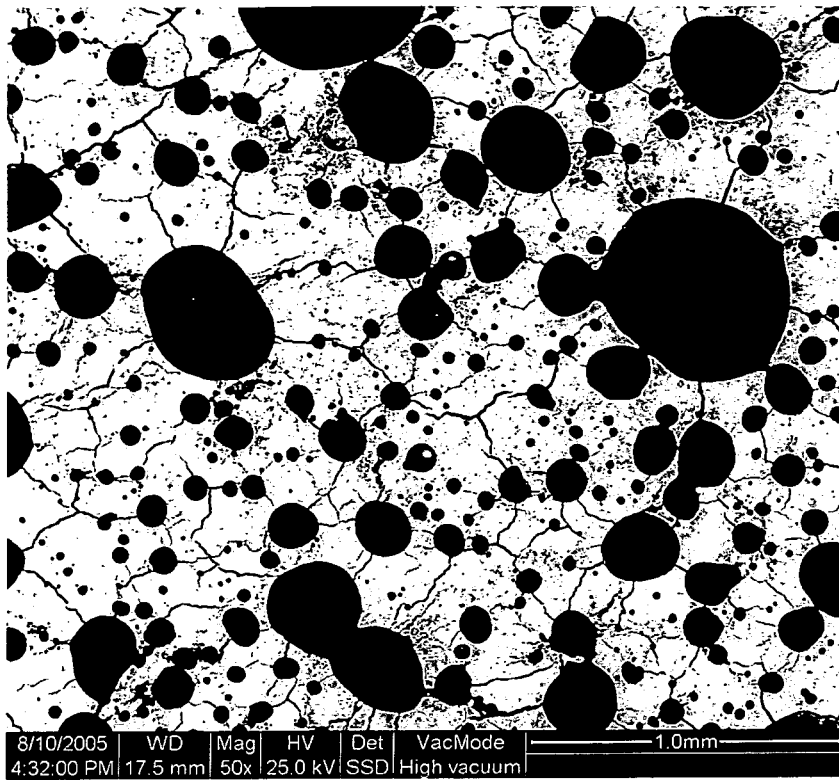
FIG. 9 depicts an optical image of a matrix of a low density geopolymeric article.

This example illustrates a method of making light weight geopolymeric shaped articles with voids therein. The same precursor formulation as described in Example 3 was used, except that 0.4 g of zinc metal was used as a blowing agent instead of the aluminum powder. The precursor mixture was placed in a mold and left to harden autogenously. In this example, the zinc powder reaction with water less vigorously than that of the aluminum powder in Example 3. As such, the precursor material was not broken up into pieces but formed an article of the desired shape as configured by the mold. The article was light weight since it contained multiple microvoids throughout its structure; the voids primarily due to the release of the hydrogen gas. The voids-containing structure of the shaped article is as shown in FIG. 9.

Example 6

Figure 10:
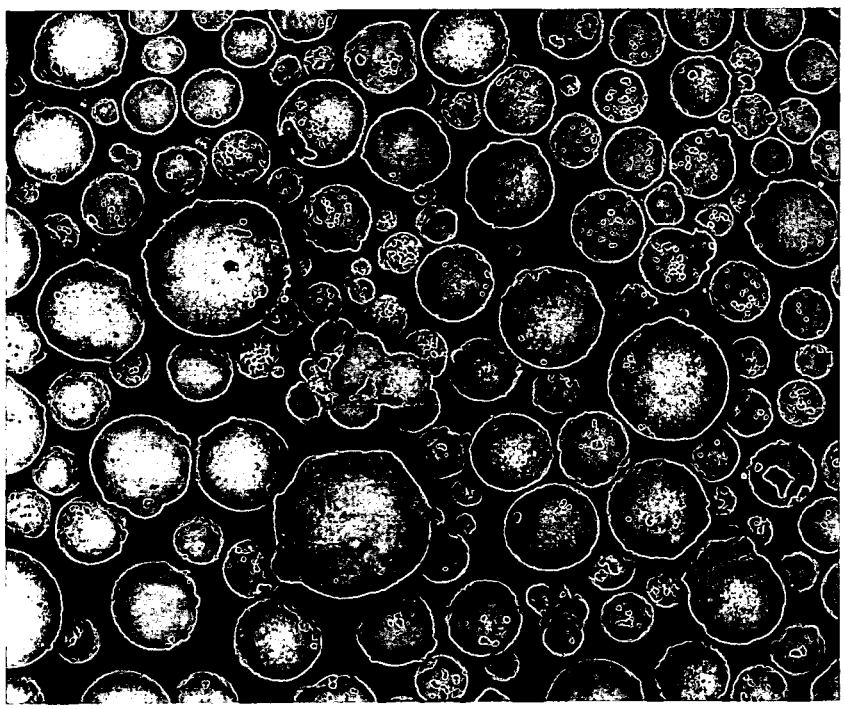
FIG. 10 depicts an optical image of geopolymeric microspheres.
Figure 11:
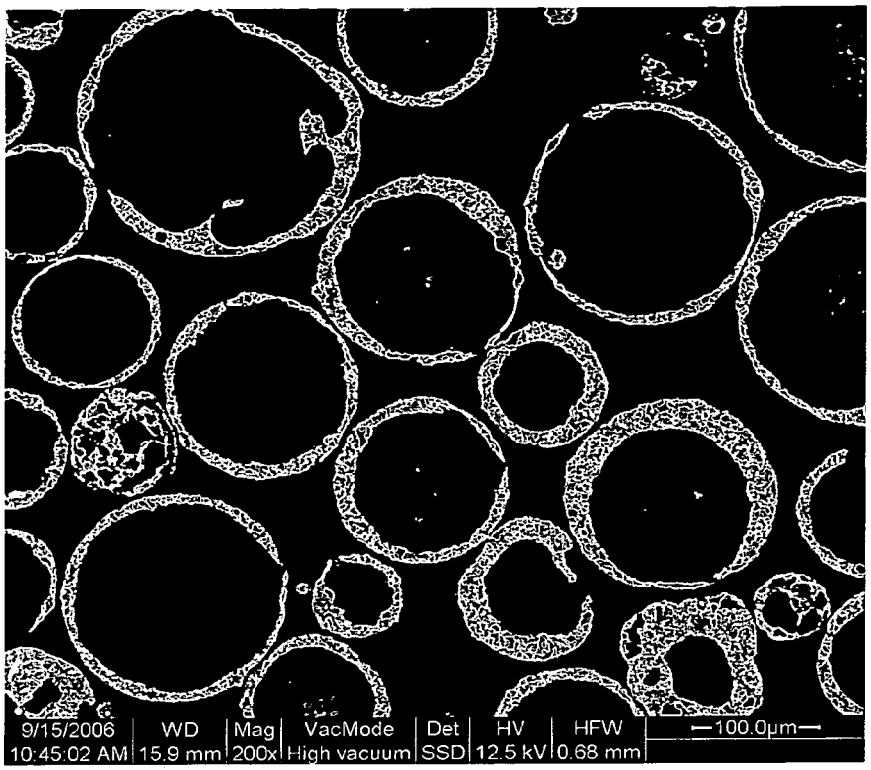
FIG. 11 is an SEM image of a polished section of geopolymeric microspheres made as described in Example 6.

This example illustrates a method of making geopolymeric hollow microspheres using a spray dryer. The formulation consists of 29.65 wt. % of metakaolin clay, 4.27 wt. % N-type sodium silicate, 5.24 wt. % D-type sodium silicate, 8.50 wt. % SHP (sodium hexametaphosphate), 5.58 wt. % sodium hydroxide, 1.19 wt. % aluminum powder, 18.00% of sodium hydroxide. The formulation is added to water to form a slurry with a solids content of 27.3 wt.%. The slurry was then spray dried by atomizing nozzle in a spray dryer. The spray dryer had an inlet air temperature of 500° C. and outlet air temperature of 270° C. The end-product collected from the spray dryer was examined using optical image and SEM, an example of which is depicted in FIGS. 10 and 11. As may be seen from the figure, the geopolymetric particles are in the configuration of hollow microsphere. FTIR spectra of metakaolin and the end-product were obtained, showing significant transformation from the raw material to a geopolymeric containing particle.

Figure 12:
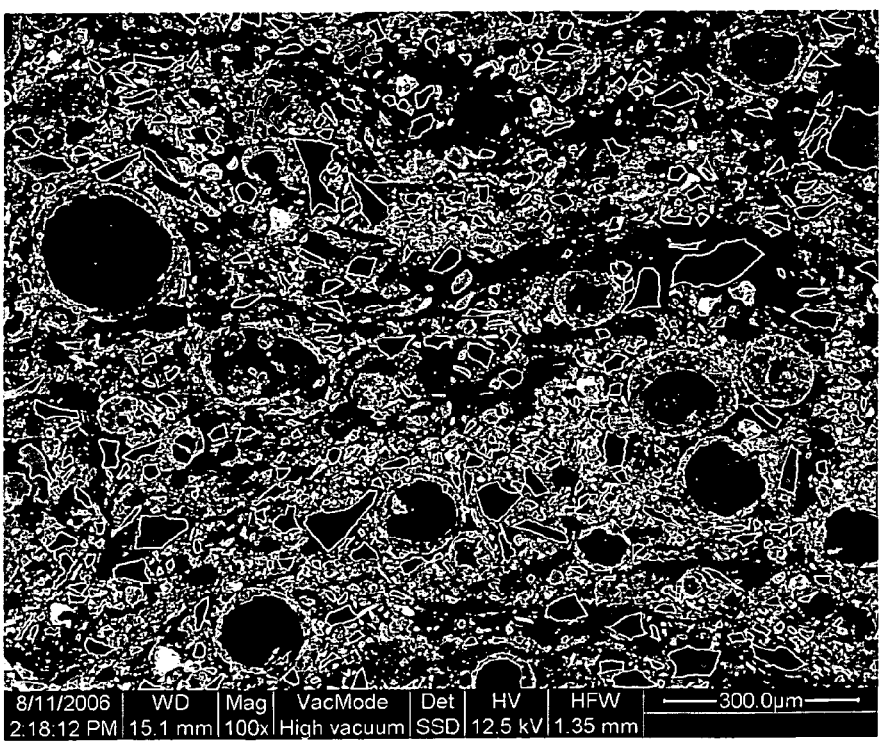
FIG. 12 depicts a backscattered electron image (BEI) showing geopolymeric microspheres incorporated in a fiber cement matrix.

The geopolymeric particles as microspheres formed from this example were incorporated into a fiber cement formulation containing essentially silica sand, cement, fiber and water to form a fiber cement pad. The pad was formed in a mold and subjected to an autoclaving condition similar to that used in forming fiber cement building products to allow cement hydration, curing, setting and hardening. The pad was examined under SEM as depicted in FIG. 12. FIG. 12 shows that the geopolymeric microspheres survived the autoclave condition, showing substantially intact hollow spherical configuration within the fiber cement matrix.

There are many advantages associated with the novel use of geopolymers instead of glass, conventional ceramics, and polymers to manufacture particles and fibers. One such advantage is to eliminate melting and high temperature processing associated with melting and subsequent forming methods. Another advantage is that geopolymeric products as described herein, not only have excellent strength, but are able to withstand high service temperatures, for example greater than 600° C., whether in air or reducing or in an oxidizing atmosphere, and without significant degradation, which is unlike polymers, graphite and most commercial glasses. As a result, geopolymeric products as provided herein are excellent for fire proofing uses as well as providing chemically stability, strength, high versatility and economic advantages for production and incorporation into other products.

Additional objects, advantages and novel features of the invention as set forth in the description, will be apparent to one skilled in the art after reading the foregoing detailed description or may be learned by practice of the invention. The objects and advantages of the invention may be realized and attained by means of instruments and combinations described and particularly pointed out here.

The invention claimed is:

1. A geopolymer precursor formulation for forming a shaped geopolymeric particle by geopolymerization, said geopolymer precursor formulation comprising an amorphous alumino phosphate, an alkali activator comprising sodium hydroxide, and a rheology modifier, wherein a mole ratio of sodium from the alkali activator to alumina from the alumino phosphate is between 5 to 0.1, wherein the rheology modifier is selected to modify the viscoelastic behavior of the precursor formulation so that the rate of geopolymerization is controlled to provide sufficient time for shaping of the geopolymer particle into a predetermined configuration.

2. The formulation of claim 1, wherein a shaped geopolymeric particle formed by geopolymerization in accordance with the formulation has an average cross-sectional diameter of 300 microns or less.

3. The formulation of claim 1, wherein the overall dimension of a shaped geopolymeric particle formed by geopolymerization in accordance with the formulation is greater than 0.1 µm.

4. The formulation of claim 3, wherein a surface of the shaped geopolymeric particle is selected from the group consisting of substantially smooth, substantially rough, spiked, porous and varying combinations thereof.

5. The formulation of claim 3, wherein the shaped geopolymeric particle has a density of less than 2.0 g/cc.

6. The formulation of claim 3, wherein the geopolymeric particle comprises an amount of geopolymer that is at least or greater than 5% by weight of the shaped geopolymeric particle.

7. The formulation of claim 3, wherein the shaped geopolymeric particle formed by geopolymerization in accordance with the formulation is hollow.

8. The shaped geopolymeric particle of claim 7, wherein the particle is a microsphere.

9. The formulation of claim 3, wherein the shaped geopolymeric particle formed by geopolymerization in accordance with the formulation has one or more voids therein.

10. The formulation of claim 9, wherein the one or more voids provide a structure selected from the group consisting of hollow, porous, foam-like and varying combinations thereof.

11. The formulation of claim 3, wherein the shaped geopolymeric particle has a wall thickness between 0.1 to 45% of an average cross-sectional diameter of the shaped geopolymeric particle.

12. The formulation of claim 3, wherein the shaped geopolymeric particle is a flake.

13. The formulation of claim 3, wherein the shape of the geopolymeric particle is selected from the group consisting of substantially round, donut-shaped, oval, elongated, tubular, square, polygonal, substantially flat and varying combinations thereof.

14. The formulation of claim 3, wherein the shaped geopolymeric particle is multi-layered.

15. The formulation of claim 1, further comprising one or more additives.

16. The formulation of claim 1 further comprising a blowing agent.

17. The formulation of claim 16, wherein a shaped geopolymeric particle formed by geopolymerization in accordance with the formulation is a microsphere.

18. The formulation of claim 1 further comprising a cement, said formulation having a viscoelastic region adapted to allow formation of the predetermined configuration into the shaped geopolymeric particle.

* * * * *